United States Patent
Morota et al.

(10) Patent No.: US 9,496,795 B2
(45) Date of Patent: Nov. 15, 2016

(54) SWITCHING POWER SUPPLY APPARATUS

(71) Applicant: Panasonic Intellectual Property Management Co., Ltd., Osaka (JP)

(72) Inventors: Naohiko Morota, Hyogo (JP); Tatsuya Sakurai, Osaka (JP);
(Continued)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/820,529

(22) Filed: Aug. 6, 2015

(65) Prior Publication Data

US 2015/0349651 A1 Dec. 3, 2015

Related U.S. Application Data

(63) Continuation of application No. PCT/JP2014/000557, filed on Feb. 4, 2014.

(30) Foreign Application Priority Data

Feb. 20, 2013 (JP) ................................. 2013-030711
Aug. 23, 2013 (JP) ................................. 2013-173694

(51) Int. Cl.
*H02M 3/335* (2006.01)
*H02M 1/00* (2006.01)

(52) U.S. Cl.
CPC . *H02M 3/33523* (2013.01); *H02M 2001/0032* (2013.01); *Y02B 70/16* (2013.01)

(58) Field of Classification Search
CPC ................. H02M 3/33523; H02M 2001/0032; Y02B 70/16
See application file for complete search history.

(56) References Cited

U.S. PATENT DOCUMENTS 6,577,512 B2* 6/2003 Tripathi ............. H05B 33/0815
363/21.15
7,489,532 B2* 2/2009 Shih ........................ G05F 1/70
363/21.01
(Continued)

FOREIGN PATENT DOCUMENTS

JP 5-252662 9/1993
JP 2002-247847 A 8/2002
(Continued)

OTHER PUBLICATIONS

International Search Report of PCT application No. PCT/JP2014/000557 dated Apr. 22, 2014.

*Primary Examiner* — Jue Zhang
(74) *Attorney, Agent, or Firm* — McDermott Will & Emery LLP

(57) ABSTRACT

A switching power supply apparatus of the present disclosure is a device connection state detection circuit that detects a connection state in a load device connection terminal in a power supply system having the load device connection terminal. The device connection state detection circuit includes a transformer, a switching element, a pulse generator, and a waveform detection circuit. The waveform detection circuit detects a voltage or a current generated in a primary winding wire or a secondary winding wire of the transformer in accordance with operation of a pulse signal, compares the detected voltage or current with a preset reference value, and outputs an output signal in accordance with a comparison result, to an OFF terminal.

10 Claims, 34 Drawing Sheets

(72) Inventors: Takashi Saji, Shiga (JP); Keita Kawabe, Osaka (JP); Kazuhiro Murata, Hyogo (JP); Koji Suzuki, Kyoto (JP); Yoshihiro Mori, Tokyo (JP)

(56) References Cited

U.S. PATENT DOCUMENTS

| | | |
|---|---|---|
| 2004/0105285 A1 | 6/2004 | Tanaka et al. |
| 2010/0039836 A1* | 2/2010 | Gong .................. H02M 3/156 363/21.13 |
| 2010/0202161 A1 | 8/2010 | Sims et al. |
| 2010/0308733 A1* | 12/2010 | Shao .................. H02M 1/4225 363/21.12 |
| 2012/0114363 A1 | 5/2012 | Inukai |
| 2014/0036549 A1* | 2/2014 | Li ..................... H02M 3/33507 363/21.12 |

FOREIGN PATENT DOCUMENTS

| | | |
|---|---|---|
| JP | 2007-143397 | 6/2007 |
| JP | 2012-105379 | 5/2012 |
| JP | 2012-147664 | 8/2012 |

* cited by examiner

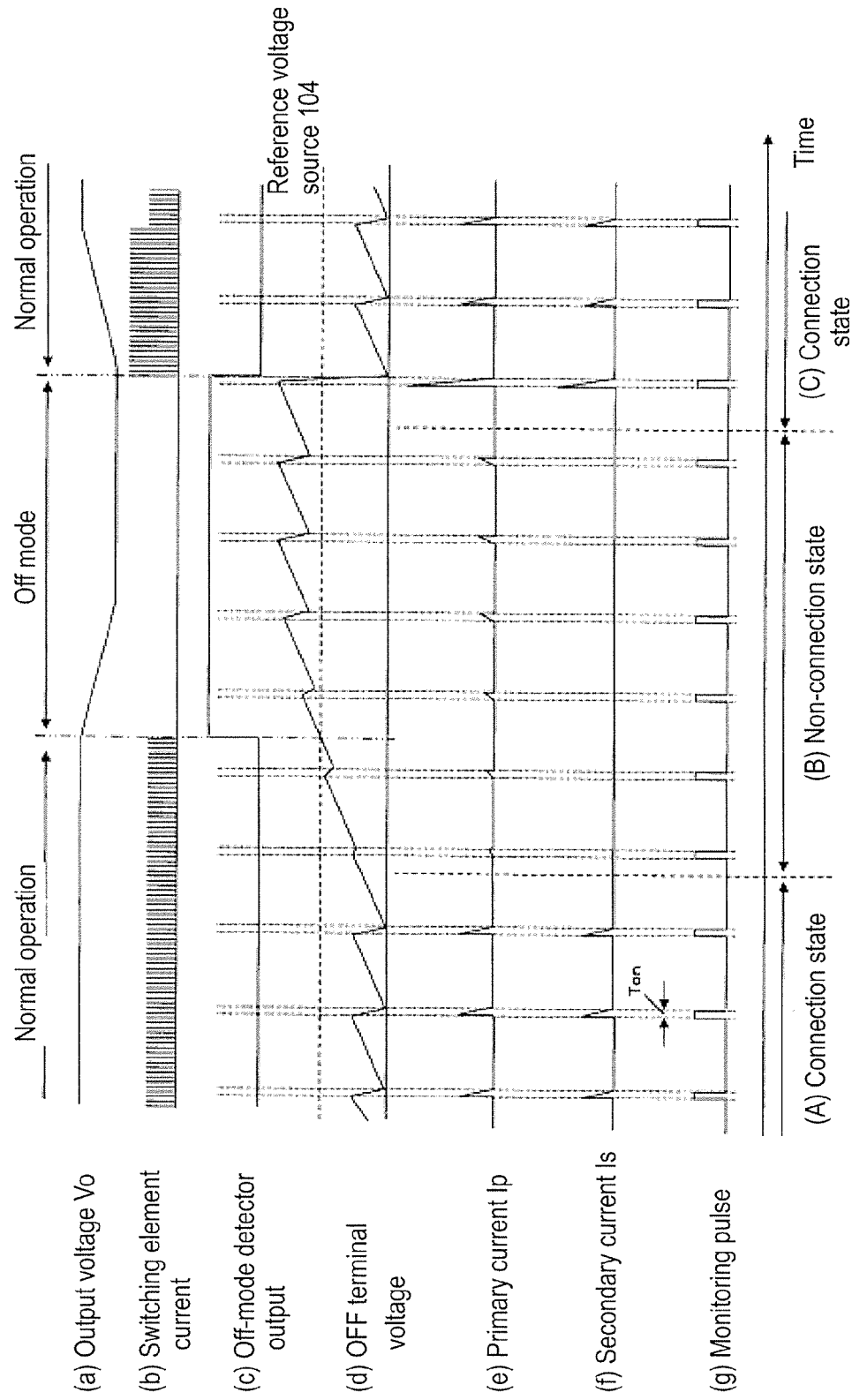

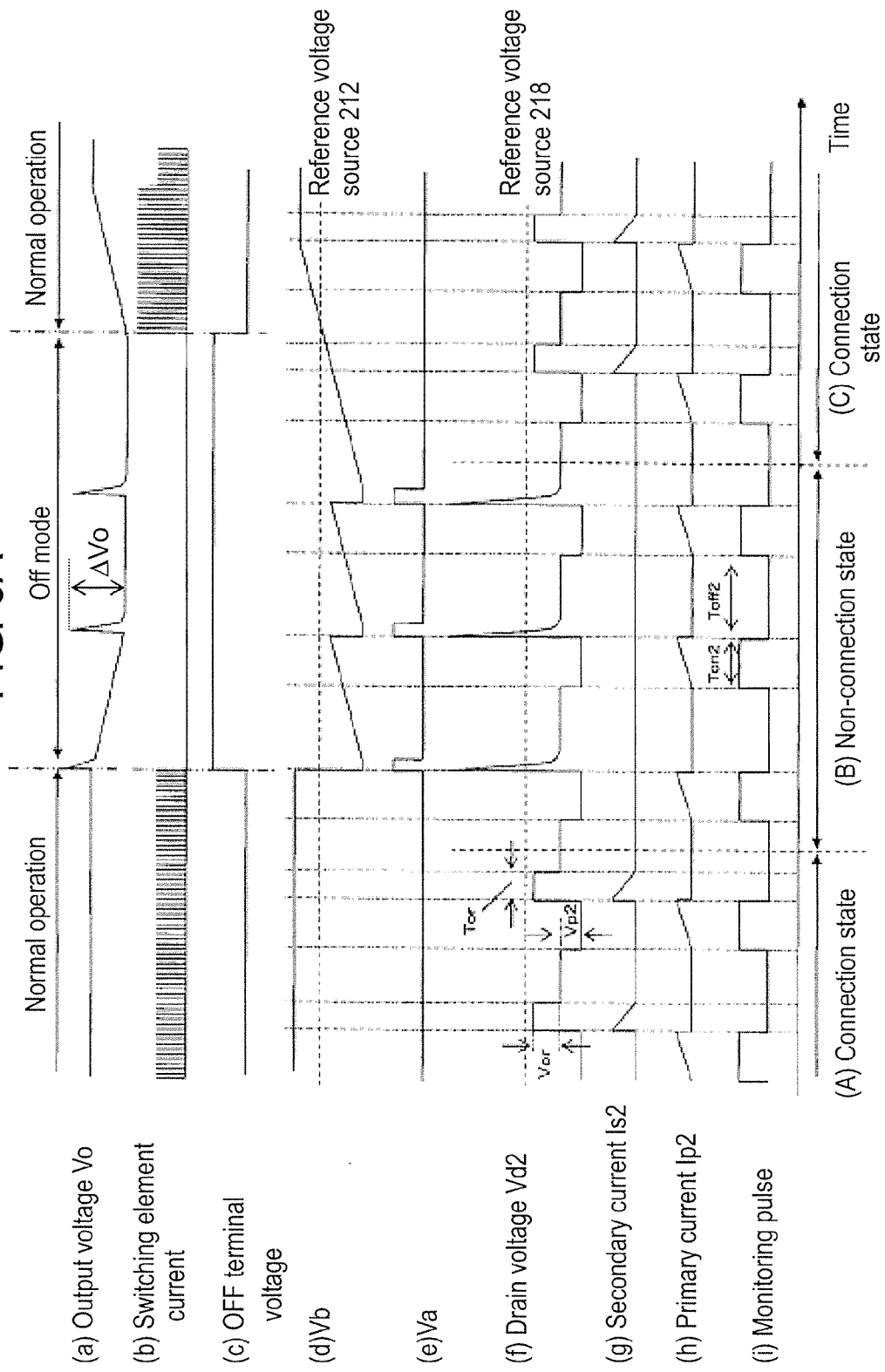

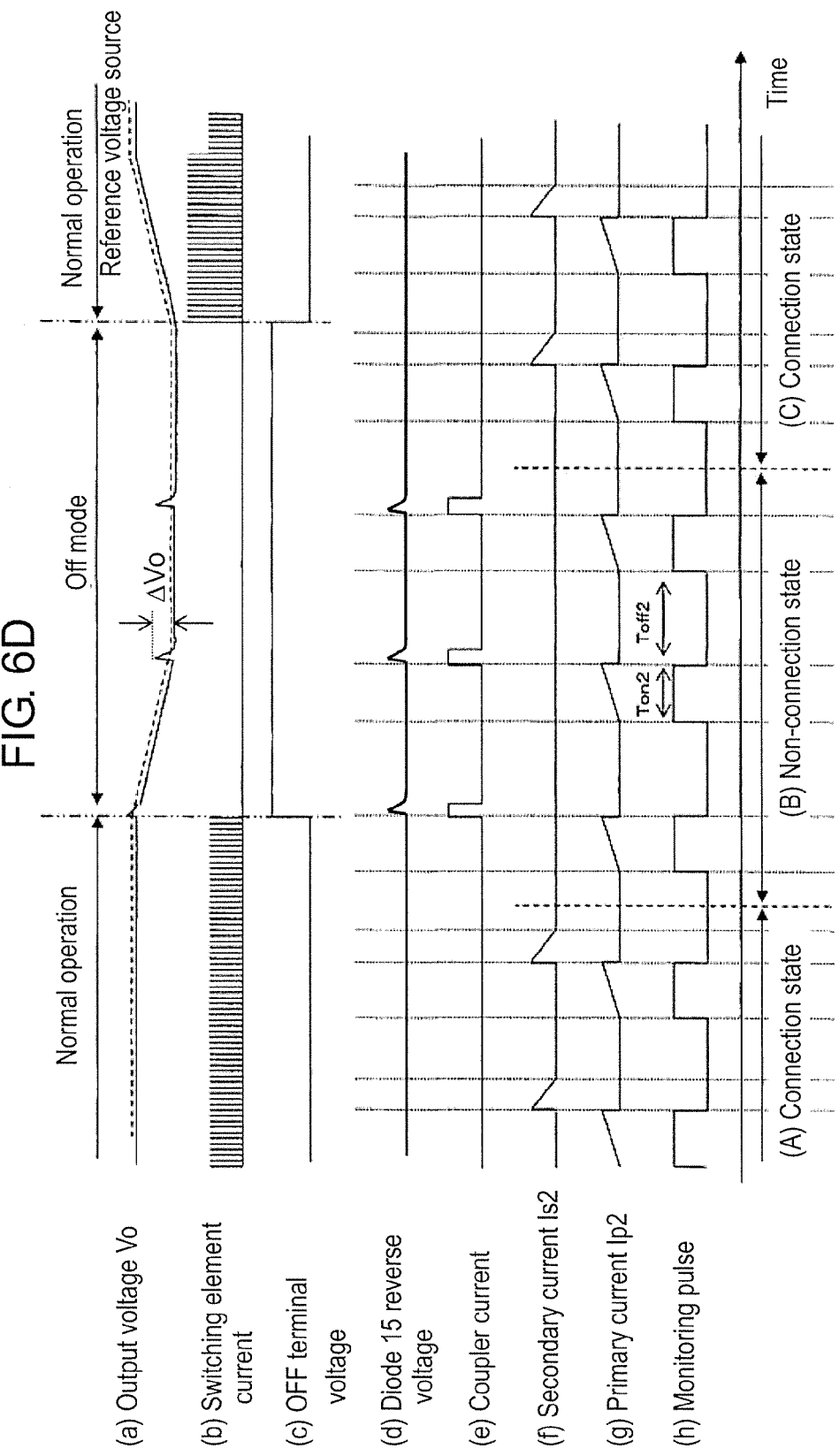

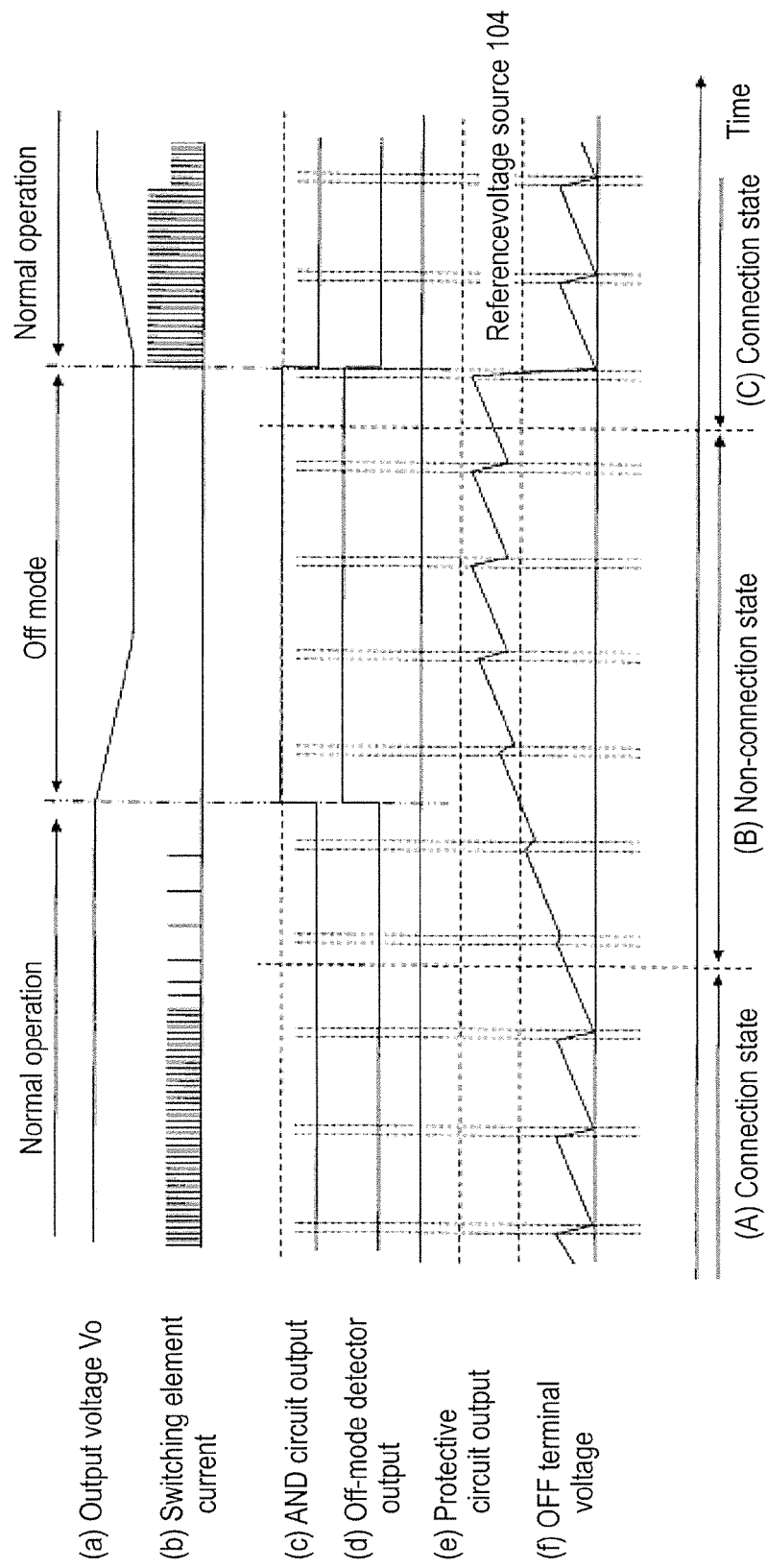

SWITCHING POWER SUPPLY APPARATUS

BACKGROUND OF THE INVENTION

1. Field of the Invention

The present disclosure relates to a switching power supply apparatus that controls an output voltage by switching of an input voltage through a switching element, and a device connection state detection circuit.

2. Description of the Related Art

In recent years, environmental problems such as an energy problem have been noticed, and there is a strong demand on reduction in standby power of a power supply apparatus such as a switching power supply apparatus. For example, there is proposed a system for lowering an output voltage to reduce power consumption, in a case where power supply from a switching power supply apparatus is unnecessary, for example in a state where a load device is not connected, in an AC adapter or a battery charger.

There is proposed a conventional, technology of detecting presence/absence of a load of an AC adapter, stopping operation of a switching power supply apparatus to reduce power consumption when an output side is in an unloaded condition, and further restarting operation to start power supply when a voltage is applied from a load device connected to the output side, in Unexamined Japanese Patent Publication No. 2007-14339 (PTL 1).

As a power supply of the load device, a power storage component such as a primary battery and a secondary battery is conceivably used.

FIG. 22 illustrates a configuration example of a conventional switching power supply apparatus, in which operation of the switching power supply apparatus is stopped when the output side is in an unloaded condition, and the operation is restarted when a voltage is applied to the output side from the load device. Hereinafter, the operation of the switching power supply apparatus is briefly described.

A loaded condition of secondary load device 912 is monitored by output control circuit 911 through resistor 909. In a case where an unloaded condition is detected, a no-load detection signal is input to power ON/OFF circuit 905 from output control circuit 911 through coupler circuit 906. Then, when an operation stop signal is input to drive control circuit 901 of switching control circuit 900 from power ON/OFF circuit 905, drive control circuit 901 controls drive circuit 902 so as to stop operation of switching element 7. Then, an output voltage of the switching power supply apparatus becomes zero.

In a case where the operation of the switching power supply apparatus is restarted, when the output voltage is zero, a voltage is applied from a power storage unit (not illustrated) of load device 912 through output terminal 16, so that output control circuit 911 detects that the output voltage is not zero. Then, by use of this voltage as a power supply, output control circuit 911 inputs a restart signal to power ON/OFF circuit 905 through photocoupler 910. At the same time, generation of an operation stop signal from power ON/OFF circuit 905 is stopped for a fixed period. When an operation start signal is input to drive control circuit 901 from power ON/OFF circuit 905, drive control circuit 901 controls drive circuit 902 so as to start the operation of switching element 7.

By use of this technology, it is possible to implement a system, in which when the switching power supply apparatus (e.g., AC adapter) is not connected to the load device (e.g., notebook computer) (unloaded condition), the switching operation of the switching power supply apparatus can be stopped to reduce power consumption (off mode), and when the switching power supply apparatus is connected to the load device, and a voltage is applied from the power storage component (e.g., battery) of the load device, the switching power supply apparatus starts power supply, for example.

CITATION LIST

Patent Literature

PTL 1: Unexamined Japanese Patent Publication No. 2007-143397

SUMMARY OF THE INVENTION

However, the above system has the following problem.

In order to operate again the switching power supply apparatus whose operation is stopped, a voltage is applied from the power storage unit of the load device. Furthermore, in order to transmit a restart signal from a secondary side to a primary side, the photocoupler is used. However, in a case where electric charges stored in the power storage component such as a primary battery or a secondary battery mounted on the load device becomes empty, a voltage cannot be applied, or the photocoupler cannot be operated. In this case, there is a fatal problem that a state where the operation is stopped is maintained, and shift to normal operation cannot be achieved, even when the switching power supply apparatus is connected to the load device, and the switching power supply apparatus tries to be activated.

The present disclosure solves the above problem, and provides a switching power supply apparatus capable of being activated regardless of a state of a power storage component such as a primary battery and a secondary battery, and a device connection state detection circuit configuring the switching power supply apparatus.

A switching power supply apparatus includes: a second switching element to which an input voltage is supplied; an output terminal detachably mounted on a load device; an input/output conversion circuit that converts the input voltage switched by the second switching element into an output voltage, to supply power to the load device connected to the output terminal; a switching control circuit that controls switching operation of the second switching element, and has an off mode for stopping the switching operation in accordance with a signal input to an OFF terminal; a first rectifier circuit connected between the input/output conversion circuit and the output terminal; a transformer having a secondary winding wire whose first end is connected to the output terminal; a first switching element connected to a primary winding wire of the transformer; a pulse generator that supplies a pulse signal to a gate terminal of the first switching element; and a device connection state detection circuit including a waveform detection circuit that detects a voltage or a current generated in the winding wire of the transformer in accordance with the pulse signal, compares the detected voltage or current with a preset reference value, and outputs, to the OFF terminal, an output signal in accordance with a comparison result.

According to this configuration, a device connection state detection circuit can detect a connection state of a power supply system and a load device even in a case where there is no power on a secondary side of the switching power supply apparatus, or in a primary battery or a secondary battery mounted on the load device.

BRIEF DESCRIPTION OF DRAWINGS

FIG. 3 is a timing chart illustrating operation of the switching power supply apparatus according to the first exemplary embodiment of the present disclosure;

FIG. 6A is a timing chart illustrating operation of the switching power supply apparatus according to the second exemplary embodiment of the present disclosure;

FIG. 6D is a timing chart illustrating operation of the switching power supply apparatus according to another example of the fourth exemplary embodiment of the present disclosure;

FIG. 10A is a timing chart illustrating operation during normal operation of the switching power supply apparatus according to the fifth exemplary embodiment of the present disclosure;

DETAILED DESCRIPTION OF THE PREFERRED EMBODIMENTS

First Exemplary Embodiment

A switching power supply apparatus and a device connection state detection circuit of a first exemplary embodiment of the present disclosure is described.

Figure 1:
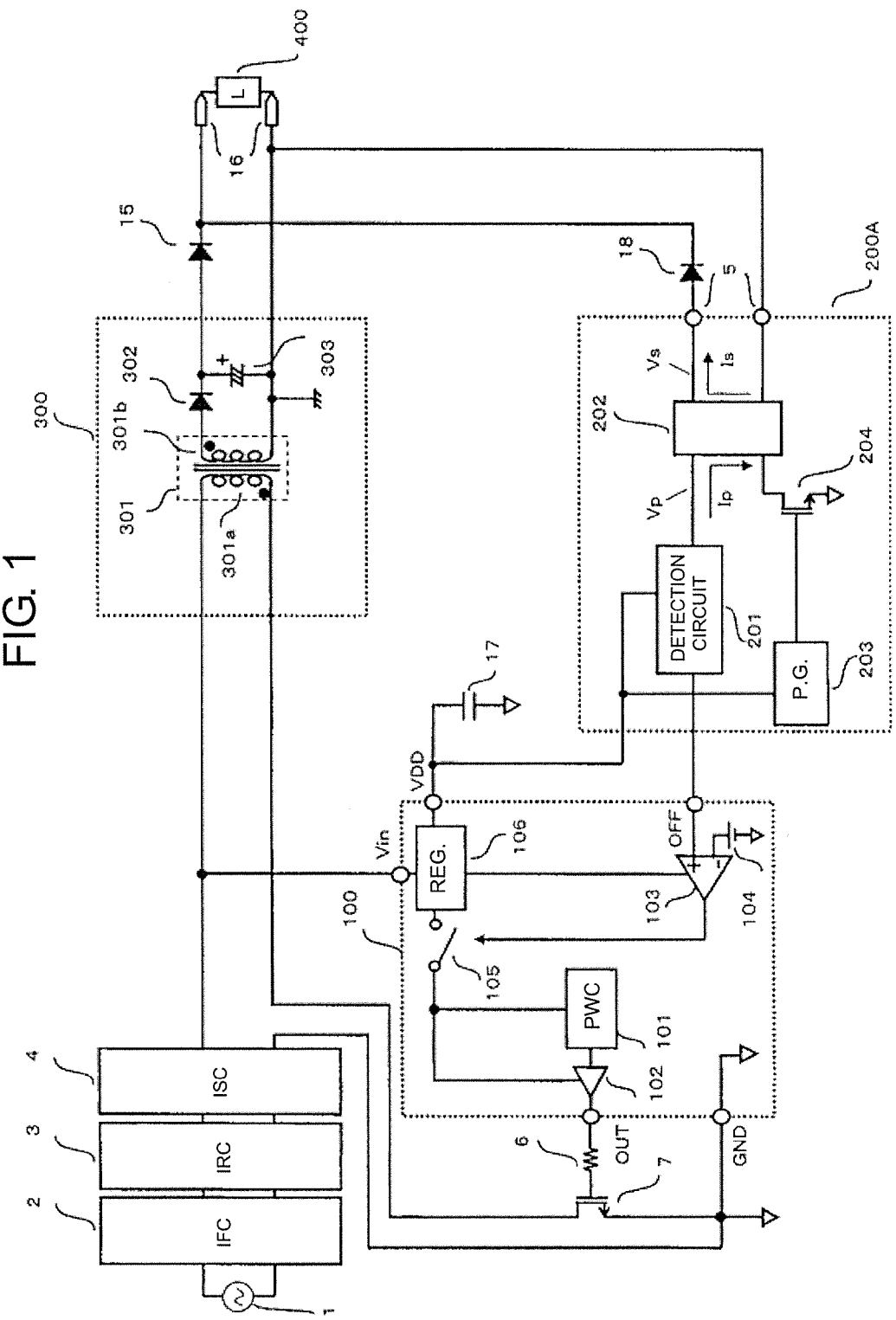
FIG. 1 is a circuit diagram illustrating a configuration example of a switching power supply apparatus and a device connection state detection circuit according to a first exemplary embodiment of the present disclosure.

FIG. 1 is a circuit diagram illustrating a configuration example of the switching power supply apparatus and the device connection state detection circuit according to the first exemplary embodiment.

In FIG. 1, an input AC voltage from commercial power supply 1 passes through input filter circuit 2, input rectifier circuit 3, input smoothing circuit 4 to be input as an input DC voltage to input/output conversion circuit 300.

Input/output conversion circuit 300 is disposed in order to convert, into a desired output voltage, an input voltage that is input. For example, as illustrated in FIG. 1, input/output conversion circuit 300 includes transformer 301 for power conversion, diode 302, and smoothing capacitor 303, transformer 301 has primary winding wire 301a and secondary winding wire 301b, and polarities of primary winding wire 301a and secondary winding wire 301b are reverse. This switching power supply apparatus is a flyback switching power supply apparatus.

Switching element 7 is connected to primary winding wire 301a, an OUT terminal output signal of switching control circuit 100 is input to a control electrode (gate) of switching element 7, so that on-off switching control is performed.

Switching control circuit 1.00 has five terminals, namely a Vin terminal, a VDD terminal, a GND terminal, an OUT terminal, and an OFF terminal as external input/output terminals. As illustrated in FIG. 1, switching control circuit includes, for example, pulse width control circuit 101, drive circuit 102, off-mode detector 103, reference voltage source 104, off-mode switch 105, regulator 106, and the like.

The Vin terminal is a power supply terminal of switching control circuit 100, and power is supplied from a line to which an input DC voltage of the input smoothing circuit is output. The power input from the Vin terminal is input to regulator 106 to be supplied to a circuit inside switching control circuit 100 through regulator 106.

The GND terminal is connected to a low potential side of the input smoothing circuit, and serves as a voltage reference on a primary side.

The OUT terminal is a terminal connected to a gate of switching element 7 through resistor 6.

The VDD terminal is a terminal for a reference voltage of switching control circuit 100. Capacitor 17 is connected to the VDD terminal, and during operation, a charging current flows into capacitor 17 from the VDD terminal, and a voltage of capacitor 17 rises. This voltage is controlled by switching control circuit 100 so as to become constant at a reference voltage.

The OFF terminal is a terminal, for receiving an off-mode signal output from device connection state detection circuit 200A, and switching an off mode and normal operation.

Output terminal 16 includes two terminals, namely a terminal for outputting an output voltage output from input/output conversion circuit 300, and a secondary GND terminal.

Load device 400 is an electronic device such as a notebook computer and a tablet personal computer, and is detachably mounted on output terminal 16.

Device connection state detection circuit 200A is disposed in order to detect whether output terminal 16 and load device 400 are in a connection state or a non-connection state, and is connected to the VDD terminal, the OFF terminal, and the GND terminal of switching control circuit 100, and output terminal 16, and an anode of diode 18.

As illustrated in FIG. 1, device connection state detection circuit 200A includes, for example, load device connection terminal 5, waveform detection circuit 201, transformer 202, pulse generator 203, and switching element 204.

Figure 2A:
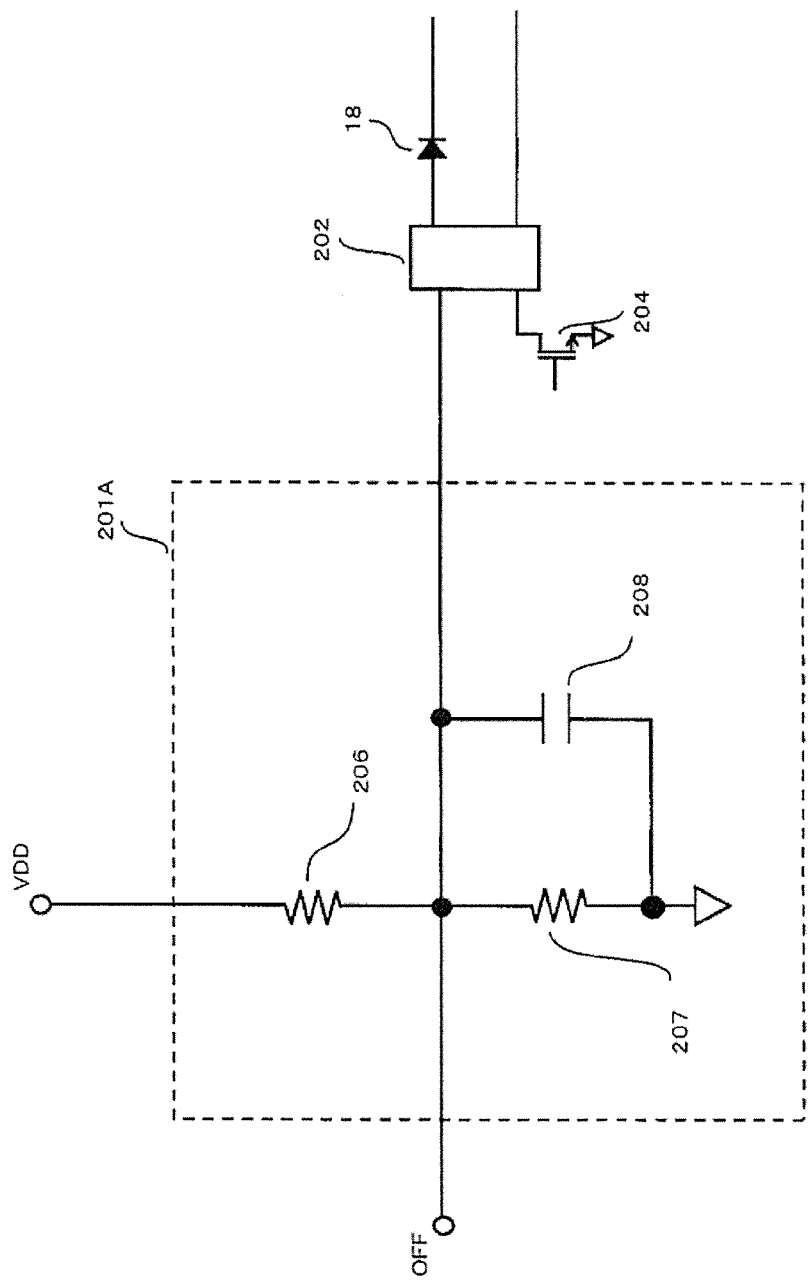
FIG. 2A is a circuit diagram illustrating a configuration example of a waveform detection circuit according to the first exemplary embodiment of the present disclosure.

Waveform detection circuit 201 includes, for example, resistor 206, resistor 207, and capacitor 208, like waveform detection circuit 201A in FIG. 2A.

Figure 2B:
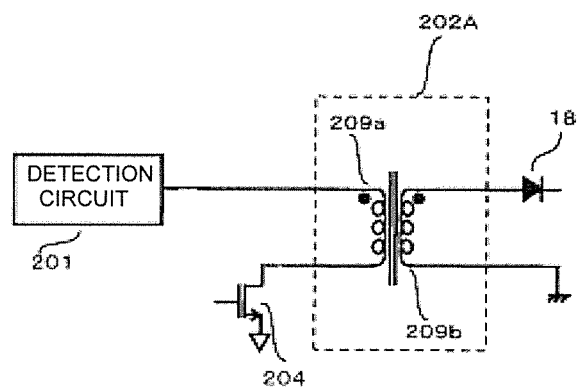
FIG. 2B is a circuit diagram illustrating a configuration example of a transformer according to the first exemplary embodiment of the present disclosure.

Transformer 202 has, for example, primary winding wire 209a and secondary winding wire 209b, like transformer 202A in FIG. 2B, and polarites of primary winding wire 209a and secondary winding wire 209b are forward directions.

Figure 2C:
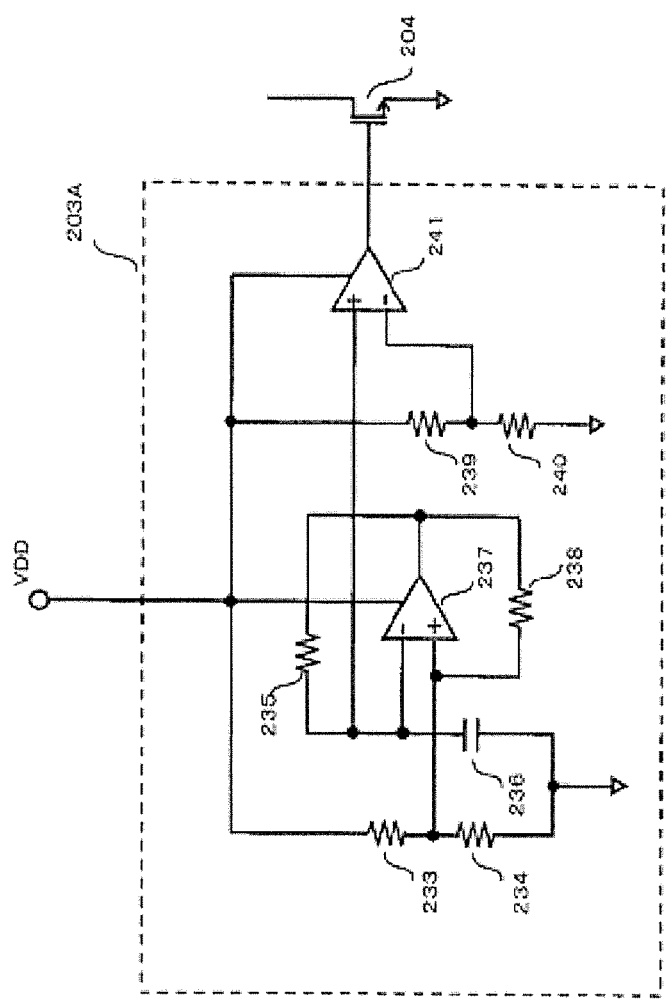
FIG. 2C is a circuit diagram illustrating a configuration example of a pulse generator according to the first exemplary embodiment of the present disclosure.

Pulse generator 203 includes, for example, resistors 233, 234, 235, 238, 239 and 240, capacitor 236, operational amplifier 237, and voltage comparator 241, like pulse generator 203A in FIG. 2C. This circuit is a generally known pulse generating circuit, and therefore detailed description of operation is omitted.

An output pulse of pulse generator 203 is input to a control electrode (gate) of switching element 204, so that switching element 204 performs on-off switching control. As switching element 204, for example, a transistor such as a MOSFET is used.

Diode 15 is disposed in order to prevent a signal for detecting a connection state of output terminal 16 and load device 400 from flowing into input/output conversion circuit 300. An anode of diode 15 is connected to a secondary-side output of input/output conversion circuit 300, and a cathode of diode 15 is connected to output terminal 16.

Diode 18 is disposed in order to prevent an output current from input/output conversion circuit 300 from flowing into transformer 202, an anode of diode 18 is connected to load device connection terminal 5, and a cathode of diode 18 is connected between the cathode of diode 15 and output terminal 16.

Operation of the switching power supply apparatus and the device connection state detection circuit illustrated in FIG. 1, which are configured described above, is described.

When an AC voltage is input from commercial power supply 1 through input filter circuit 2, the AC voltage is rectified and smoothed by input rectifier circuit 3 and input smoothing circuit 4, to be converted into a DC voltage. A starting current is supplied to switching control circuit 100 from this DC voltage. When switching control circuit 100 is brought into an operable state, control to cause switching element 7 to switch is started, and power is supplied to load device 400 from input/output conversion circuit 300 through output terminal 16.

From the VDD terminal of switching control circuit 100, power is supplied to device connection state detection circuit 200A. To capacitor 208 of waveform detection circuit 201, electric charges are charged from the VDD terminal through resistor 206. When a current is supplied from the VDD terminal, pulse generator 203 outputs a monitoring pulse to a gate of switching element 204. When the monitoring pulse is input to the gate of switching element 204, switching element 204 is brought into a conductive state.

When switching element 204 is brought into the conductive state, primary current Ip obtained by synthesizing exciting current Te and secondary current Is transmitted through transformer 202 and flowing in secondary winding wire 209b flows in primary winding wire 209a. This secondary current Is changes by an impedance of load device 400.

When Np denotes a number of turns of primary winding wire 209a, Ns denotes a number of turns of secondary winding wire 209b, Lp denotes an inductance value of primary winding wire 209a, Vp denotes a voltage input to primary winding wire 209a, Vs denotes a voltage output from secondary winding wire 209b, Vfd denotes a forward voltage of diode 18, Vo denotes an output voltage of output terminal 16, Z denotes an impedance of load device 400, and Ton denotes time during which the gate of switching element 204 is conductive, the following relational expressions are established.

$$Ip=Ie+Is \quad \text{(Expression 1)}$$

$$Ie=(Vp/Lp) \cdot Ton \quad \text{(Expression 2)}$$

$$Is=(Vs-Vfd-Vo)/Z \quad \text{(Expression 3)}$$

$$Vs=(Ns/Np) \cdot Vp \quad \text{(Expression 4)}$$

In a case where output terminal 16 and load device 400 are in a connection state, Is>0 needs to be satisfied in order to transmit secondary current Is to primary current Ip, and therefore Ns, Np, and Vp need to be set such that Vs−Vfd−Vo>0 is satisfied.

For example, in a case of Vp=5 V, turn ratio Ns/Np=5, Vfd=1 V, Vo=20 V, and Z=100 ohm, Vs=25V is satisfied by (Expression 4), and Is=0.04 A is further satisfied by (Expression 3).

In a case where output terminal 16 and load device 400 are in a non-connection state, an impedance between the terminals included in output terminal 16 may be considered as Z=∞, and Is=0 A is satisfied by (Expression 3).

This change of secondary current Is is reflected in primary current Ip as shown in (Expression 1), and therefore waveform detection circuit 201 detects in accordance with this change of primary current Ip whether or not output terminal 16 and load device 400 are in the connection state.

Herein, operation of waveform detection circuit 201 in each of a case where output terminal 16 and load device 400 are in a connection state, a case where output terminal 16 and load device 400 shift to a non-connection state, a case where output terminal 16 and load device 400 shift from the non-connection state to the connection state is separately described.

FIG. 3 is a timing chart illustrating operation of the switching power supply apparatus in FIG. 1.

First, the case where output terminal 16 and load device 400 are in the connection state is described (period (A) in FIG. 3).

In a case where output terminal 16 and load device 400 are connected, a closed circuit including secondary winding wire 209b and load device 400 is formed, impedance Z by load device 400 exists. In order to detect a difference of the connection state of output terminal 16 and load device 400, a value of impedance Z is preferably about several milliohm to about several hundred ohm.

When a monitoring pulse ((g) in FIG. 3) output from pulse generator 203 is input to the gate of switching element 204, secondary current Is ((f) in FIG. 3) flows in secondary winding wire 209b, is transmitted to primary winding wire 209a, and is synthesized to become primary current Ip. Electric charges stored in capacitor 208 are discharged by primary current Ip (e) in FIG. 3). Electric charges are charged in capacitor 208 from the VDD terminal through resistor 206 until a next monitoring pulse is input. At this time, resistance values of resistor 206 and resistor 207 are preferably set such that electric charges are charged in capacitor 208 at about several hundred nA. Consequently, an amount of the electric charges discharged by primary current Ip become larger than an amount of electric charges charged from the VDD terminal, and therefore waveform detection circuit 201 maintains an OFF terminal voltage at a lower value than reference voltage source 104 of off-mode detector 103 ((d) in FIG. 3). As a result, off-mode detector 103 outputs an L level signal ((c) in FIG. 3), switching control circuit 100 controls off-mode switch 105 to be in a conductive state, and therefore switching element 7 maintains switching operation ((b) in FIG. 3), and the switching power supply apparatus continues normal operation.

Now, the case where output terminal 16 and load device 400 shift to the non-connection state (period shifted from (A) to (B) in FIG. 3) is described.

When output terminal 16 and load device 400 shift from the connection state to the non-connection state, the closed circuit including secondary winding wire 209b and load device 400 becomes an open circuit. Therefore, since impedance Z between the terminals included in output terminal 16 may be considered as Z=∞, secondary current. Is=0 is satisfied, and Ip=Ie is satisfied by (Expression 1).

At this time, when an amount of electric charges charged from the VDD terminal to capacitor 208 is set to be larger than an amount of electric charges discharged by exciting current Ie, an OFF terminal voltage rises until the amount of the electric charges charged from the VDD terminal, and the amount of the electric charges discharged by primary current Ip are balanced.

At this time, there is a fear that a rise in the OFF terminal voltage is prevented by discharge of electric charges in capacitor 208 by exciting current Ie. Therefore, in order to suppress influence by exciting current Ie, a pulse width of several μs to several tens μs is preferable in a case where the monitoring pulse is a square wave. Additionally, pulse generator 203 preferably performs control so as to output the monitoring pulse in a cycle of about 0.2 Hz to about 60 Hz.

When the OFF terminal voltage becomes higher than a voltage of reference voltage source 104 of off-mode detector 103, switching control circuit 100 brings off-mode switch 105 into an interruption, state, and performs control so as to stop the switching operation of switching element 7. Then, output voltage Vo ((a) in FIG. 3) lowers to 0 V, and power consumption of the switching power supply apparatus is reduced.

Additionally, in the off mode, power is supplied to regulator 106 from the Vin terminal, and power is supplied to off-mode detector 103 through regulator 106. Off-mode detector 103 continues to control off-mode switch 105 to interrupt also in the off mode.

Now, the case where output terminal 16 and load device 400 shift from the non-connection state to the connection state (period shifted from (B) to (C) in FIG. 3) is described.

When output terminal 16 and load device 400 shift from the non-connection state to the connection state, the closed circuit including secondary winding wire 209b of transformer 202A and load device 400 is formed, and impedance Z by load device 400 exists.

Therefore, when a monitoring pulse is input, secondary current Is flows in the closed circuit, and secondary current Is is synthesized to become primary current Ip. Then, an amount of electric charges discharged from capacitor 208 by primary current Ip is larger than an amount of electric charges charged in capacitor 208, and therefore an OFF terminal voltage is lowered. When the OFF terminal, voltage is lowered to become lower than a voltage of reference voltage source 104 of off-mode detector 103, switching control circuit 100 controls off-mode switch 105 to be in a conductive state, and therefore switching element 7 starts switching operation to continue normal operation.

At this time, electric charges may not be stored in the power storage component such as the primary battery and the secondary battery mounted on load device 400. For example, a battery of a notebook computer may be empty.

Thus, even in a case where there is no power on the secondary side of the switching power supply apparatus, or in the primary battery or the secondary battery mounted on load device 400, the switching power supply apparatus of this exemplary embodiment can detect the connection state of output terminal 16 and load device 400, and off mode control of the switching power supply apparatus can be performed.

Pulse generator 203 may be included in switching control circuit 100. Additionally, capacitor 236 is disposed outside and regulation is performed, so that it is possible to easily generate a monitoring pulse in a long cycle.

Second Exemplary Embodiment

Now, a switching power supply apparatus of a second exemplary embodiment of the present disclosure is described.

The switching power supply apparatus according to the second exemplary embodiment is different from the switching power supply apparatus according to the first exemplary embodiment in a configuration of transformer 205, a configuration of waveform detection circuit 201, and connection of waveform detection circuit 201 and transformer 205 in device connection state detection circuit 200B.

Figure 4A:
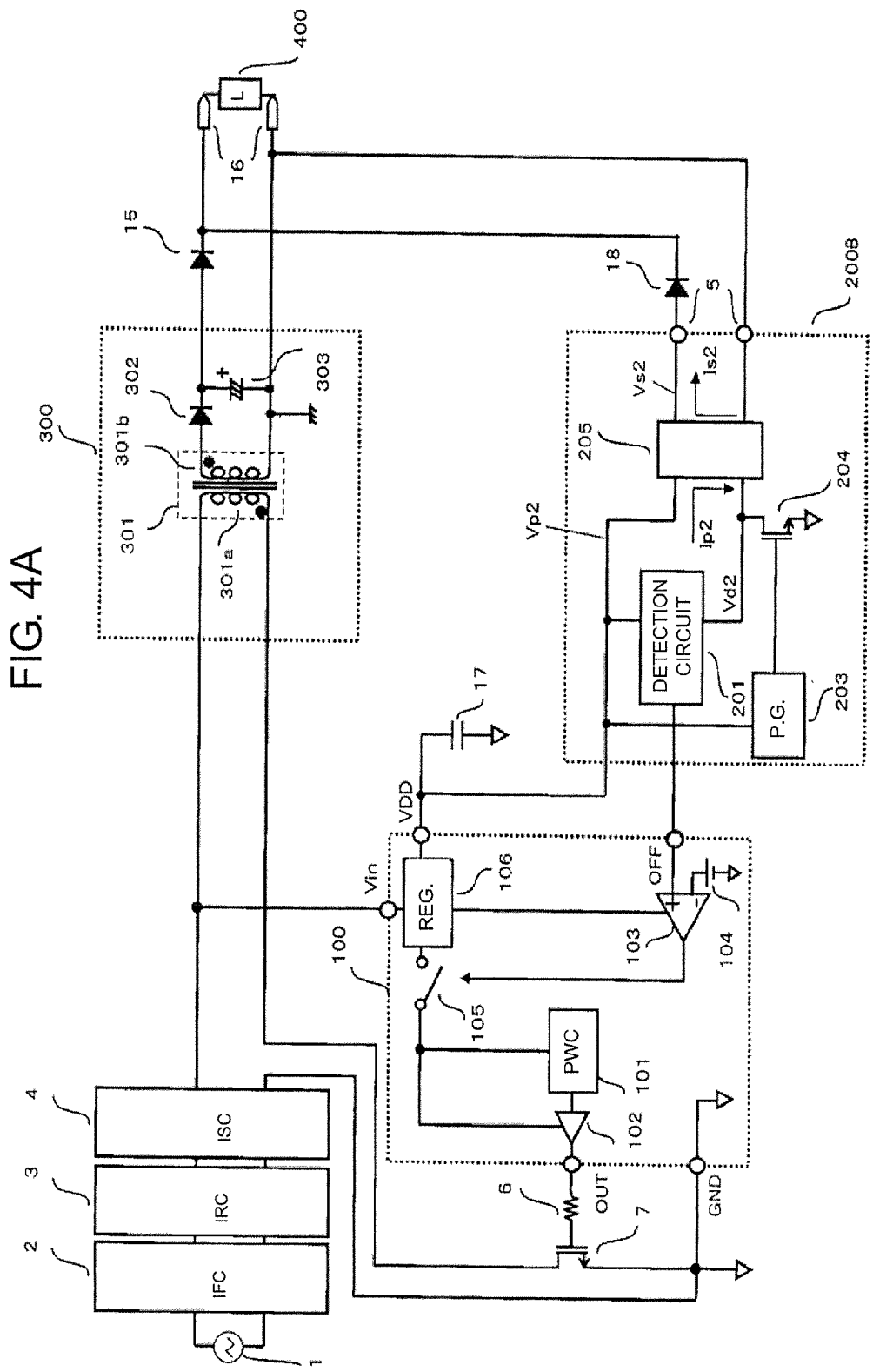
FIG. 4A is a circuit diagram illustrating a configuration example of a switching power supply apparatus and a device connection state detection circuit according to a second exemplary embodiment of the present disclosure.
Figure 5A:
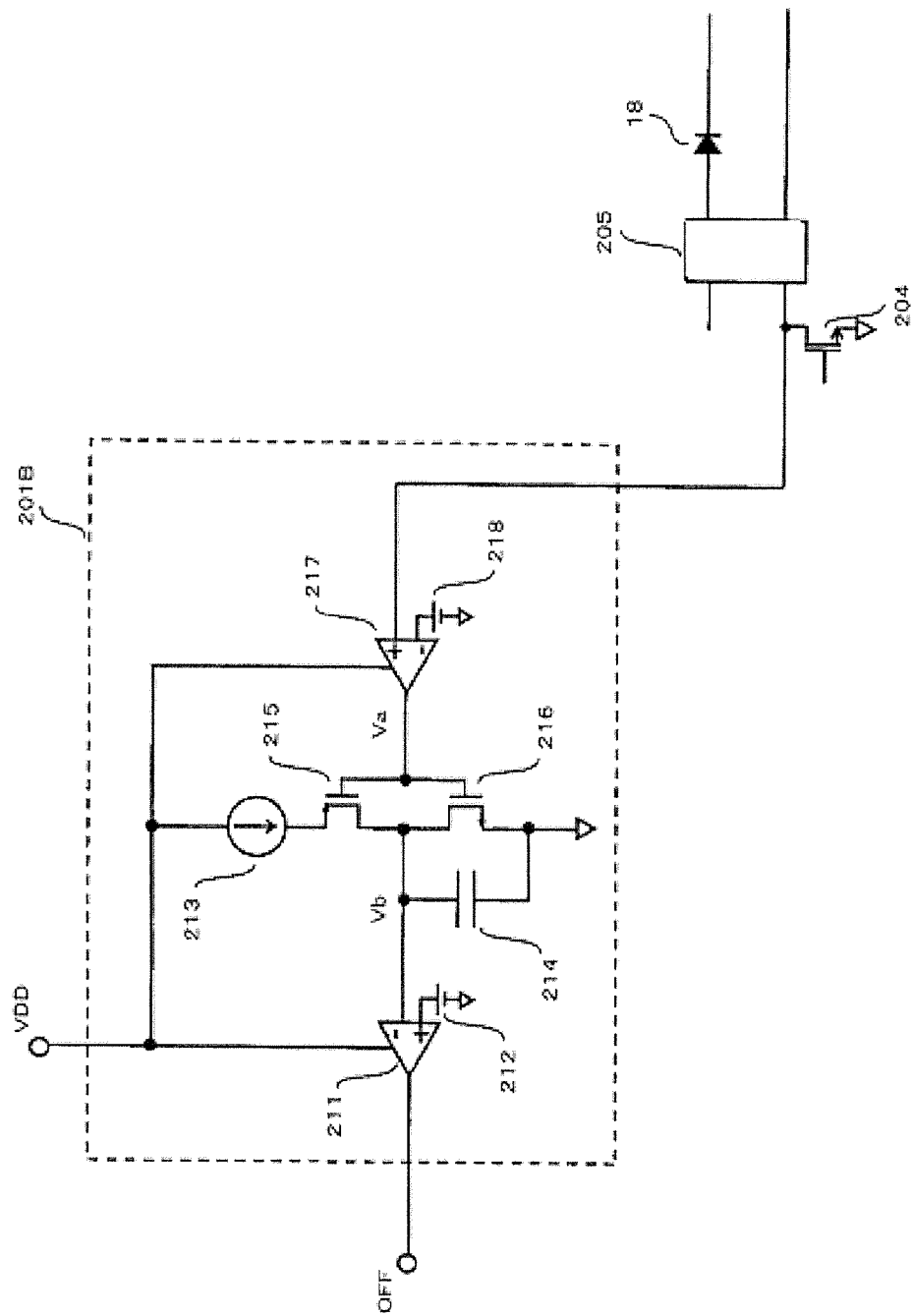
FIG. 5A is a circuit diagram illustrating a configuration example of a waveform detection circuit according to the second exemplary embodiment of the present disclosure.

FIG. 4A illustrates an example of the switching power supply apparatus according to the second exemplary embodiment. Waveform detection circuit 201 includes, for example, voltage comparator 211, constant current source 213, capacitor 214, PchMOSFET 215, NchMOSFET 216, voltage comparator 217, reference voltage sources 212 and 218, like waveform detection circuit 201B in FIG. 5A.

Figure 5B:
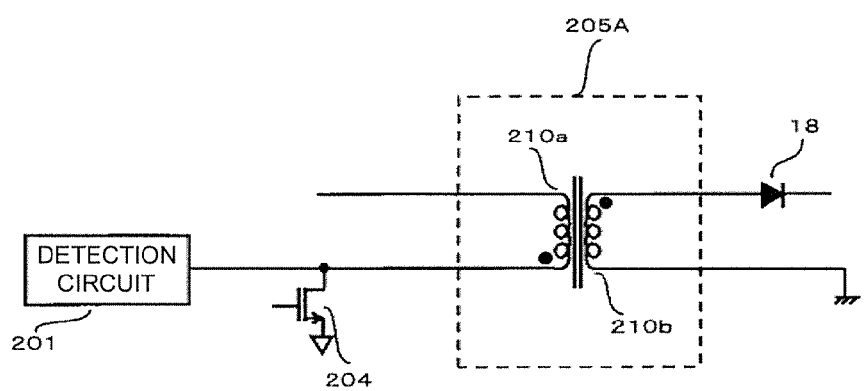
FIG. 5B is a circuit diagram illustrating a configuration example of a transformer according to the second exemplary embodiment of the present disclosure.

Transformer 205 includes, for example, primary winding wire 210a and secondary winding wire 210b like transformer 205A in FIG. 5B, and polarities of primary winding wire 210a and secondary winding wire 210b are reverse.

Hereinafter, components identical with the components of the switching power supply apparatus of the first exemplary embodiment illustrated in FIG. 1 are denoted by the same reference numerals, description of these components is omitted, and operation of a point different from the first exemplary embodiment is mainly described.

The point different from the first exemplary embodiment is a method of detection of a connection state of output terminal 16 and load device 400 by device connection state detection circuit; 200B. Therefore, a case where output terminal 16 and load device 400 are in a connection state, a case where output terminal 16 and load device 400 shift to a non-connection state, a case where output terminal 16 and load device 400 shift to the connection state are hereinafter described.

FIG. 6A is a timing chart illustrating operation of the switching power supply apparatus in FIG. 4A.

The case where output terminal 16 and load device 400 are in the connection state is described (period (A) in. FIG. 6A).

In a case where output terminal 16 and load device 400 are connected, a closed circuit including secondary winding wire 210b and load device 400 is formed, and impedance Z2 by load device 400 exists.

When a monitoring pulse ((i) in FIG. 6A) output from pulse generator 203 is input to a gate of switching element 204, and switching element 204 is brought into a conductive state, primary current Ip2 flows in primary winding wire 210a ((h) in FIG. 6A). Then, during period Ton2 in which the monitoring pulse is input to the gate of switching element 204, exciting energy Ep2 is stored in primary winding wire 210a. Then, when switching element 204 is brought into a non-conductive state, exciting energy Ep2 stored in primary winding wire 210a is transmitted to a secondary side through secondary winding wire 210b.

At this time, while secondary current Is2 flows in secondary winding wire 210b ((g) in FIG. 6A), and voltage Vs2 is generated, reflector voltage Vor is generated in primary winding wire 210a.

When Np2 denotes a number of turns of primary winding wire 210a, Ns2 denotes a number of turns of secondary winding wire 210b, Vp2 denotes a voltage input to primary winding wire 210a, Lp2 denotes an inductance value of primary winding wire 210a, Ls2 denotes an inductance value of secondary winding wire 210b, Toff2 denotes time during which switching element 204 is in a non-conductive state, and ΔVo denotes an output voltage rise amount caused by exciting energy Ep2 by device connection state detection circuit 200B and diode 18, the following relational expressions are established.

$$Ip2=(Vp2/Lp2)\cdot Ton2 \qquad \text{(Expression 5)}$$

$$Ep2=Lp2\cdot (Ip2)^2/2 \qquad \text{(Expression 6)}$$

$$Vor=Np2/Ns2\cdot (Vs2+Vfd) \qquad \text{(Expression 7)}$$

$$Vs2=Is2\cdot Z2=Vo+\Delta Vo \qquad \text{(Expression 8)}$$

$$Is2=Np/Ns\cdot Ip2\cdot Ton2-Vs2/Ls2\cdot Toff2 \qquad \text{(Expression 9)}$$

When Is2≥0A is satisfied in (Expression 9), Tor that denotes time during which a reflector voltage is generated is expressed in the following expression where Is2=0, and Toff2=Tor.

$$Tor=Np/Ns\cdot Ip2\cdot Ton2\cdot Ls2/Vs2 \qquad \text{(Expression 10)}$$

$$Vor=Np2/Ns2\cdot (Vo+Vfd+\Delta Vo) \qquad \text{(Expression 11)}$$

Furthermore, when an impedance of load device 400 is defined as capacitance Cpc, exciting energy Ep2 is expressed as follows:

$$Ep2=(Cpc/2)\cdot \{(Vo+\Delta Vo)^2-Vo^2\} \qquad \text{(Expression 12)}$$

That is, exciting energy Ep2 (Expression 6) generated on a primary side is stored in the capacitance on the secondary side to be converted in (Expression 12).

Herein, in a case where Lp2 and Ip2 are constant in (Expression 6), Ep2 becomes constant. In a condition where Vo is equal, ΔVo becomes small when Cpc is large, and ΔVo becomes large when Cpc is small, by (Expression 12).

When switching element 204 is brought into the non-conductive state, in a period of Tor, drain voltage Vd2 is generated in a drain terminal of switching element 204 ((f) in FIG. 6A). Drain voltage Vd2 is expressed in the following expression.

$$Vd2=Vp2+Vor \qquad \text{(Expression 13)}$$

It is detected from a difference of a voltage waveform of Vor included, in drain voltage Vd2 whether or not output terminal 16 and load device 400 is in the connection state.

Reference voltage source 218 of voltage comparator 217 is set to be higher than drain voltage Vd2 in the connection state of load device 400 and output terminal 16.

At this time, an L level signal is output from voltage comparator 217, and a voltage of point Va becomes an L level ((e) in FIG. 6A). This L level signal is input to each of gates of PchMOSFET 215 and NchMOSFET 216, so that PchMOSFET 215 is brought into a conductive state, and NchMOSFET 216 is brought into a non-conductive state.

When PchMOSFET 215 is brought into the conductive state, electric charges are stored in capacitor 214 from constant current source 213 through PchMOSFET 215. Additionally, when a voltage of point Vb ((d) in FIG. 6A) becomes higher than a voltage of reference voltage source 212 of voltage comparator 211, output of voltage comparator 211 is maintained at an L level.

As a result, the L level signal is input to an OFF terminal ((c) in FIG. 6A), and switching control circuit 100 controls off-mode switch 105 to be in a conductive state, and therefore switching element 7 maintains switching operation ((b) in FIG. 6A), and the switching power supply apparatus continues normal operation.

The case where output terminal 16 and load device 400 shift to the non-connection state is described (period shifted from (A) to (B) in FIG. 6A).

When output terminal 16 and load device 400 shifts from the connection state to the non-connection state, the closed circuit including secondary winding wire 210b and load device 400 becomes an open circuit, and capacitance connected to output terminal 16 is only parasitic capacitance of a cable or a pattern. As a result, output voltage rise amount ΔVo by exciting energy Ep2 becomes a relatively large value to appear.

When drain voltage Vd2 rises, and becomes higher than a voltage of reference voltage source 218 of voltage comparator 217, an H level signal is output from voltage comparator 217.

This H level signal is input to each of the gates of PchMOSFET 215 and NchMOSFET 216, so that PchMOSFET 215 is brought into a non-conductive state, and NchMOSFET 216 is brought into a conductive state.

When NchMOSFET 216 is brought into the conductive state, electric charges in capacitor 214 is discharged through NchMOSFET 216, and the voltage of point Vb becomes lower than a voltage of reference voltage source 212 of voltage comparator 211, output of voltage comparator 211 is maintained at an H level.

As a result, the H level signal is input to the OFF terminal, and switching control circuit 100 brings off-mode switch 105 into an interruption state, and performs control so as to stop the switching operation of switching element 7. Then, output voltage Vo ((a) in FIG. 6A) lowers to 0 V, and power consumption of the switching power supply apparatus is reduced.

The case where output terminal 16 and load device 400 shift to the connection state is described (period shifted from (B) to (C) in FIG. 6A).

When output terminal 16 is connected to load device 400, the closed circuit including secondary winding wire 210b and load device 400 is formed, and impedance Z2 by load device 400 exists in the closed circuit. Herein, impedance Z2 includes capacitance Cpc.

When a monitoring pulse output from pulse generator 203 is input to the gate of switching element 204, switching element 204 is brought into a conductive state, the input of the monitoring pulse is terminated, and switching element 204 is brought into a non-conductive state, capacitance Cpc of load device 400 connected to output terminal 16 is connected. Therefore, in a case where capacitance Cpc is sufficiently large, output voltage rise amount ΔVo by exciting energy Ep2 becomes a small value to appear, by (Expression 12). The small value is a value negligible to output voltage Vo.

When drain voltage Vd2 of switching element 204 becomes lower than a voltage of reference voltage source 218 of voltage comparator 217, an L level signal is output from voltage comparator 217. This L level signal is input to each of the gates of PchMOSFET 215 and NchMOSFET 216, so that PchMOSFET 215 is brought into a conductive state, and NchMOSFET 216 is brought into a non-conductive state.

When PchMOSFET 215 is brought into the conductive state, electric charges are stored in capacitor 214 from constant current source 213 through PchMOSFET 215. Additionally, when the voltage of point Vb becomes higher than a voltage of reference voltage source 212 of voltage comparator 211, output of voltage comparator 211 is maintained at an L level.

As a result, the L level signal is input to the OFF terminal, switching control circuit 100 controls off-mode switch 105 to be in a conductive state, and switching operation of switching element 7 is started.

Thus, even in a case where there is no power on the secondary side of the switching power supply apparatus, or in a primary battery or a secondary battery mounted on load device 400, the switching power supply apparatus of this exemplary embodiment can detect the connection state of output terminal 16 and load device 400, and off mode control of the switching power supply apparatus can be performed, similar to the first exemplary embodiment.

First Modification of Second Exemplary Embodiment

A switching power supply apparatus according to a first modification of the second exemplary embodiment is different from the switching power supply apparatus according to the second exemplary embodiment in a configuration of waveform detection circuit 201.

Figure 7:
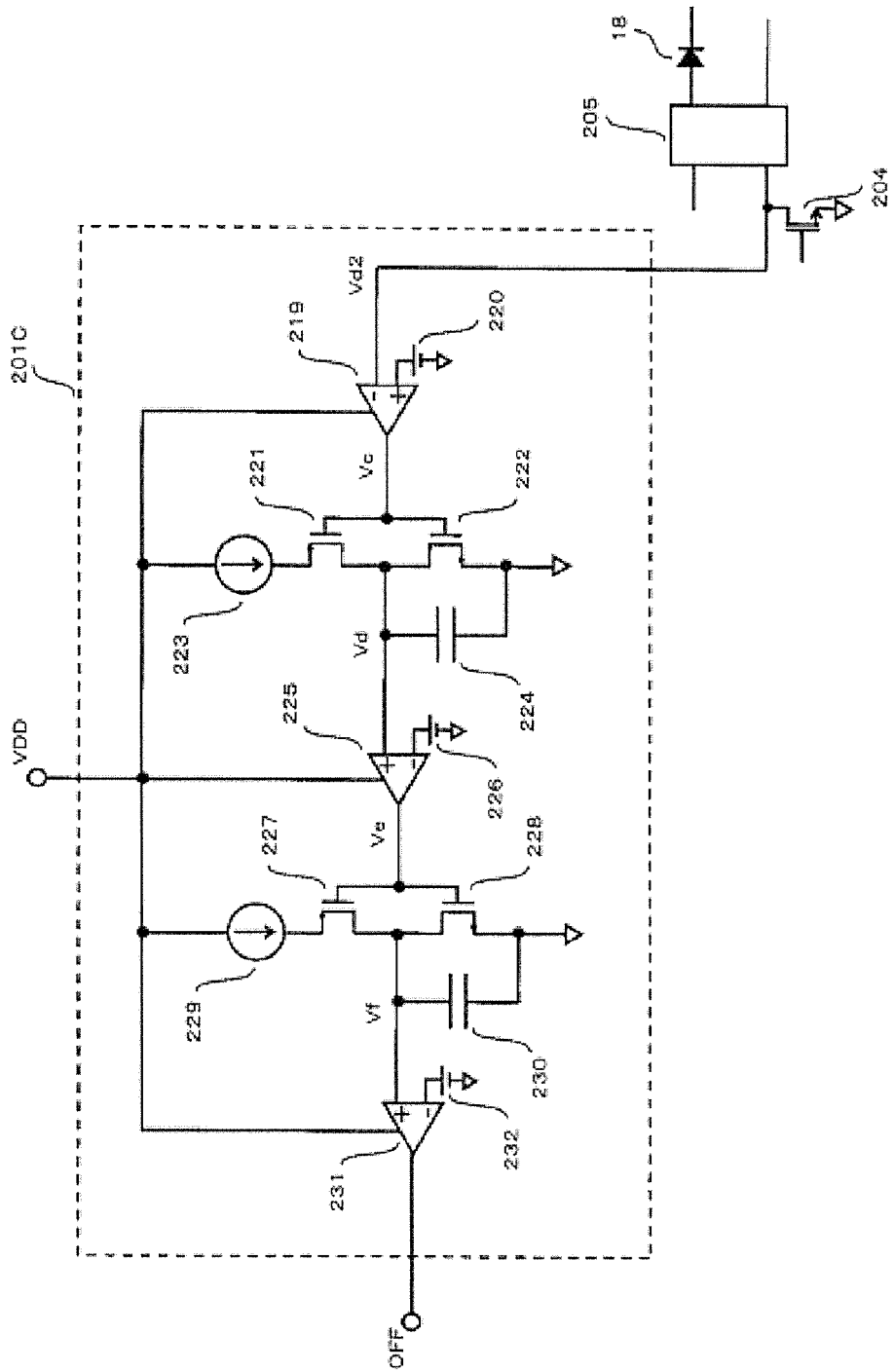
FIG. 7 is a circuit diagram illustrating a configuration example of a waveform detection circuit according to a first modification of the second exemplary embodiment of the present disclosure.

Waveform detection circuit 201 includes, for example, voltage comparators 219, 225 and 231, PchMOSFETs 221 and 227, NchMOSFETs 222 and 228, constant current sources 223 and 229, capacitors 224 and 230, and reference voltage sources 220, 226 and 232, like waveform detection circuit 201C in FIG. 7.

Hereinafter, operation of a point different from the second exemplary embodiment is mainly described.

While waveform detection circuit 201B detects connection of output terminal 16 and load device 400 by a voltage level difference of reflector voltage Vor, waveform detection circuit 201C detects connection of output terminal 16 and load device 400 by a difference of time when reflector voltage Vor is generated.

Herein, operation of waveform detection circuit 201C in each of a case where output terminal 16 and load device 400 are in a connection state, a case where output terminal 16 and load device 400 shift to a non-connection state, and a case where output terminal 16 and load device 400 shift from the non-connection state to the connection state is separately described.

Figure 8:
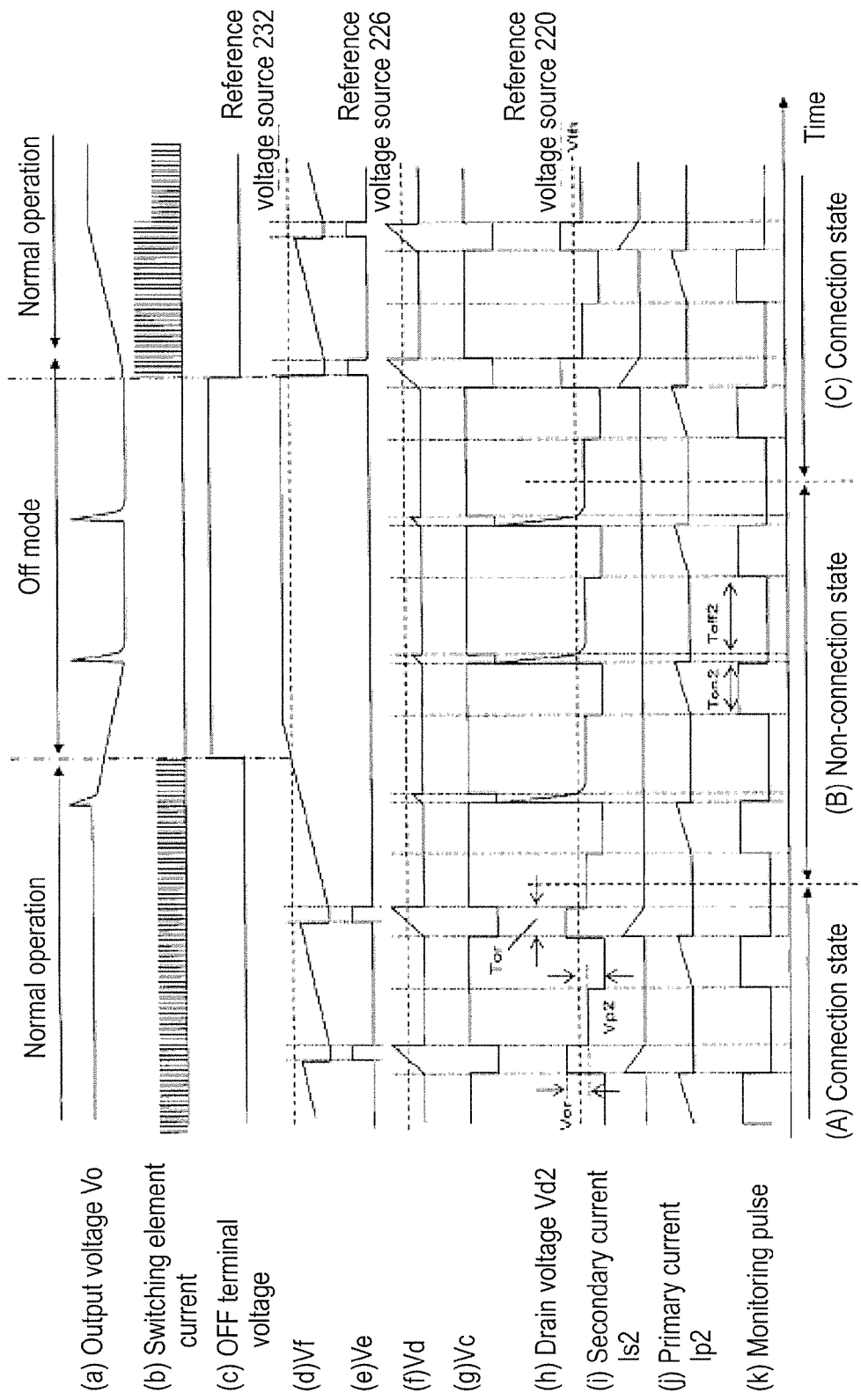
FIG. 8 is a timing chart illustrating operation of the switching power supply apparatus according to the first modification of the second exemplary embodiment of the present disclosure.

FIG. 8 is a timing chart illustrating operation of the switching power supply apparatus according to the first modification of the second exemplary embodiment.

First, the case where output terminal 16 and load device 400 are in the connection state is described (period (A) in FIG. 8).

Drain voltage Vd2 of switching element 204, expressed by (Expression 11), is input to voltage comparator 219, to be compared with reference voltage source 220. In order to compare a difference of a voltage waveform of reflector voltage Vor, voltage value Vth of reference voltage source 220 needs to be set such that Vp2+Vor>Vth>Vp2 is satisfied.

When drain voltage Vd2 becomes larger than voltage value Vth of reference voltage source 220, an L level signal is output from voltage comparator 219, and a voltage of point Vc becomes an L level ((g) in FIG. 8). This L level signal is input to each of gates of PchMOSFET 221 and NchMOSFET 222, so that PchMOSFET 221 is brought into a conductive state, and NchMOSFET 222 is brought into a non-conductive state.

When PchMOSFET 221 is brought into the conductive state, electric charges are stored in capacitor 224 from constant current source 223 through PchMOSFET 221. Additionally, when a voltage of point Vd ((f) in FIG. 8) becomes higher than a voltage of reference voltage source 226 of voltage comparator 225, output of voltage comparator 225 is maintained at an H level, and point Ye becomes an H level ((e) in FIG. 8).

This H level signal is input to each of gates of PchMOSFET 227 and NchMOSFET 228, so that PchMOSFET 227 is brought into a non-conductive state, and NchMOSFET 228 is brought into a conductive state. When NchMOSFET 228 is brought into the conductive state, electric charges in capacitor 230 is discharged through NchMOSFET 228, and a voltage of point Vf ((d) in FIG. 8) becomes lower than a voltage of reference voltage source 232 of voltage comparator 231, output of voltage comparator 231 is maintained at an L level, and therefore an OFF terminal voltage is also maintained at the L level ((c) in FIG. 8).

Consequently, switching control circuit 100 controls off-mode switch 105 to be in conductive state, and therefore switching element 7 maintains switching operation ((b) in FIG. 8), and the switching power supply apparatus continues normal operation.

Now, the case where output terminal 16 and load device 400 shift to the non-connection state is described. (period, shifted from (A) to (B) in FIG. 8).

When output terminal 16 and load device 400 shift to the non-connection state, impedance Z between the terminals included in output terminal 16 may be considered as Z=∞, and therefore secondary current Is2 does not flow ((i) in FIG. 8).

As a result, during period Ton2 in which a monitoring pulse ((k) in FIG. 8) is input to the gate of switching element 204, exciting energy Ep2 stored by flowing of primary current Ip2 ((j) in FIG. 8) in primary winding wire 210a is not transmitted to a side of secondary winding wire 210b, and therefore exciting energy Ep2 is consumed by raising drain voltage Vd2 ((h) in FIG. 8).

When drain voltage Vd2 becomes larger than voltage value Vth of reference voltage source 220, an L level signal is output from voltage comparator 219 to be input to each of the gates of PchMOSFET 221 and NchMOSFET 222, so that PchMOSFET 221 is brought into a conductive state, and NchMOSFET 222 is brought into a non-conductive state.

When PchMOSFET 221 is brought into the conductive state, electric charges are stored in capacitor 224 from constant current source 223 through PchMOSFET 221, and the voltage of point Vd rises. However, a period during which exciting energy Ep2 is consumed is shorter than a period during which reflector voltage Vor is generated when output terminal 16 and load device 400 are in the connection state, and therefore drain voltage Vd2 becomes smaller than voltage value Vth of reference voltage source 220 before becoming higher than reference voltage source 226 of voltage comparator 225, and an H level signal is output from voltage comparator 219. This H level signal is input to each of the gates of PchMOSFET 221 and NchMOSFET 222, so that PchMOSFET 221 is brought into a non-conductive state, and NchMOSFET 222 is brought into a conductive state. Therefore, when electric charges stored in capacitor 224 are discharged through NchMOSFET 222, and the voltage of point Vd becomes lower than the voltage of reference voltage source 226 of voltage comparator 225, voltage comparator 225 outputs an L level signal. Then, this L level signal is input to each of the gates of PchMOSFET 227 and NchMOSFET 228, so that PchMOSFET 227 is brought into a conductive state, and NchMOSFET 228 is brought into a non-conductive state. When PchMOSFET 227 is brought into the conductive state, electric charges are stored in capacitor 230 through PchMOSFET 227. Additionally, when the voltage of point Vf becomes higher than reference voltage source 232 of voltage comparator 231, output of voltage comparator 231 is maintained at an H level, and therefore an OFF terminal voltage is also maintained at an H level.

When the OFF terminal voltage becomes higher than reference voltage source 104 of off-mode detector 103, switching control circuit 100 controls off-mode switch 105 to be in a non-conductive state, and therefore switching element 7 stops switching operation, and the switching power supply apparatus shifts to an off mode. Then, output voltage Vo ((a) in FIG. 8) is lowered to 0 V.

Now, the case where output terminal 16 and load device 400 shift from the non-connection state to the connection state is described (period shifted from (B) to (C) in FIG. 8).

When output terminal 16 is connected to load device 400, the closed circuit including secondary winding wire 210b and load device 400 is formed, and impedance Z2 by load device 400 exists in the closed circuit.

When drain voltage Vd2 becomes larger than voltage value Vth of reference voltage source 220, an L level, signal is output from voltage comparator 219. This L level signal is input to each of the gates of PchMOSFET 221 and NchMOSFET 222, so that PchMOSFET 221 is brought into a conductive state, and NchMOSFET 222 is brought into a non-conductive state.

When PchMOSFET 221 is brought into the conductive state, electric charges are stored in capacitor 224 from constant current source 223 through PchMOSFET 221. Additionally, when the voltage of point. Vd becomes higher than a voltage of reference voltage source 226 of voltage comparator 225, output of voltage comparator 225 is maintained at an H level.

This H level signal is input to each of the gates of PchMOSFET 227 and NchMOSFET 228, so that PchMOSFET 227 is brought into a non-conductive state, and NchMOSFET 228 is brought into a conductive state. When the NchMOSFET 228 is brought into the conductive state, electric charges in capacitor 230 are discharged through NchMOSFET 228. Additionally, when the voltage of point Vf becomes lower than a voltage of reference voltage source 232 of voltage comparator 231, output of voltage comparator 231 is maintained at an L level, and therefore the OFF terminal voltage is also at the L level.

Consequently, switching control circuit 100 controls off-mode switch 105 to be in a conductive state, and therefore switching element 7 starts switching operation, and the switching power supply apparatus shifts to normal operation.

Thus, even in a case where there is no power on a secondary side of the switching power supply apparatus, or in a primary battery or a secondary battery mounted on load device 400, the switching power supply apparatus of this exemplary embodiment can detect the connection state of output terminal 16 and load device 400, and off mode control of the switching power supply apparatus can be performed, similar to the first exemplary embodiment.

Third Exemplary Embodiment

Now, a switching power supply apparatus of a third exemplary embodiment of the present disclosure is described.

The switching power supply apparatus according to the third exemplary embodiment is different from the switching power supply apparatus of the second exemplary embodiment in connection of diode 15 being a first rectifier circuit, device connection state detection circuit 200B, and diode 18 being a second rectifier circuit.

Figure 4B:
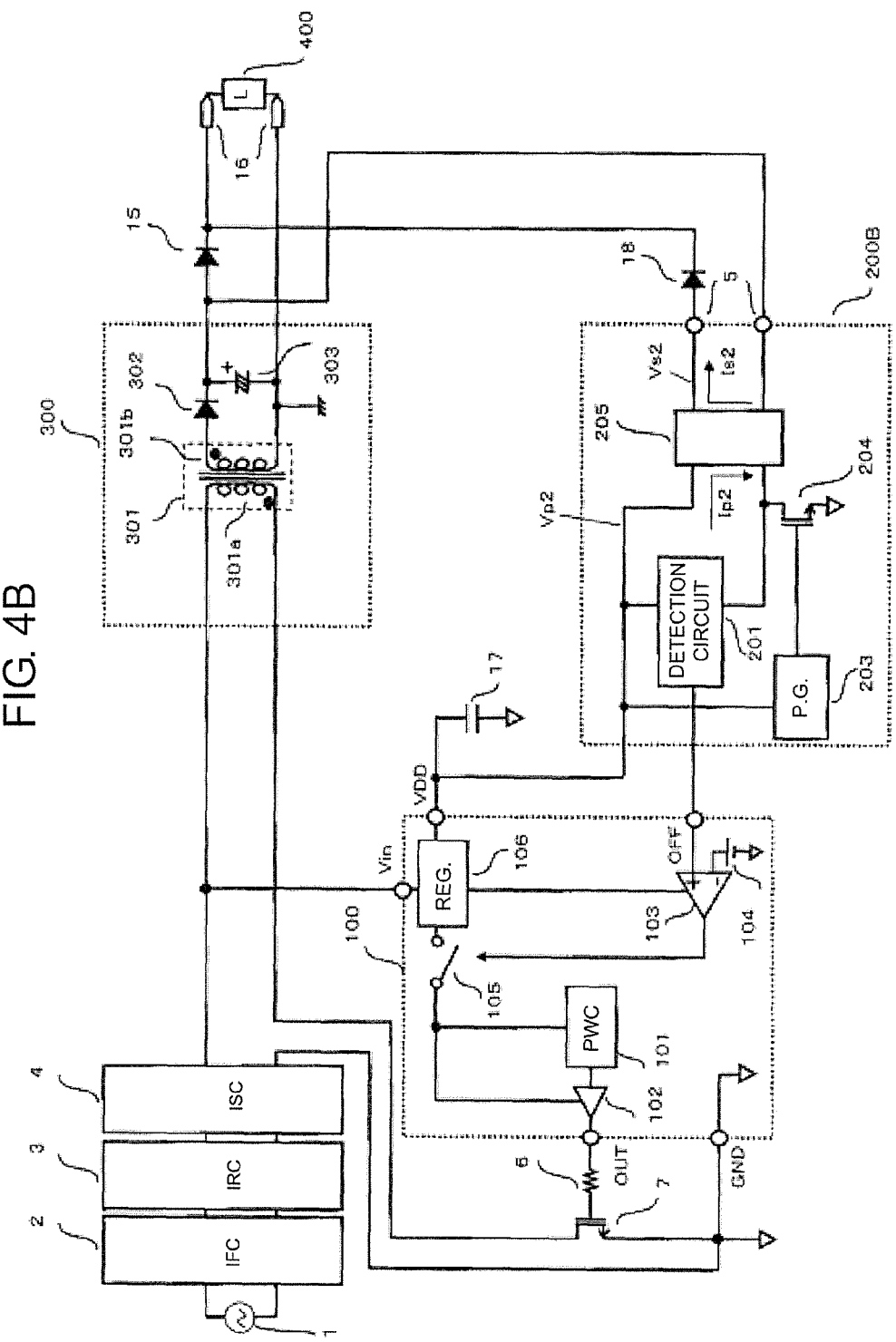
FIG. 4B is a circuit diagram illustrating a configuration example of a switching power supply apparatus and a device connection state detection circuit according to a third exemplary embodiment of the present disclosure.

FIG. 4B illustrates an example of the switching power supply apparatus according to the third exemplary embodiment.

Hereinafter, components identical with the components of the switching power supply apparatus of the second exemplary embodiment illustrated in FIG. 4A are denoted by the same reference numerals, description of these components is omitted, and operation of a point different from the second exemplary embodiment is mainly described.

In FIG. 4B, in load device connection terminal 5 of device connection state detection circuit 200B, a first end is connected to a side of a cathode of diode 15 being the first rectifier circuit through diode 18 being the second rectifier circuit, namely, is connected to a connecting point with output terminal 16, and a second end is connected to a side of an anode of diode 15 being the first rectifier circuit.

That is, device connection state detection circuit 200B is connected to both ends of diode 15, so that a potential difference (reverse voltage) that appears in the both ends of diode 15 is detected.

Transformer 205 includes primary winding wire 210a and secondary winding wire 210b like transformer 205A in FIG. 5B similarly to the second exemplary embodiment, and polarities of primary winding wire 210a and secondary winding wire 210b are reverse.

Figure 6B:
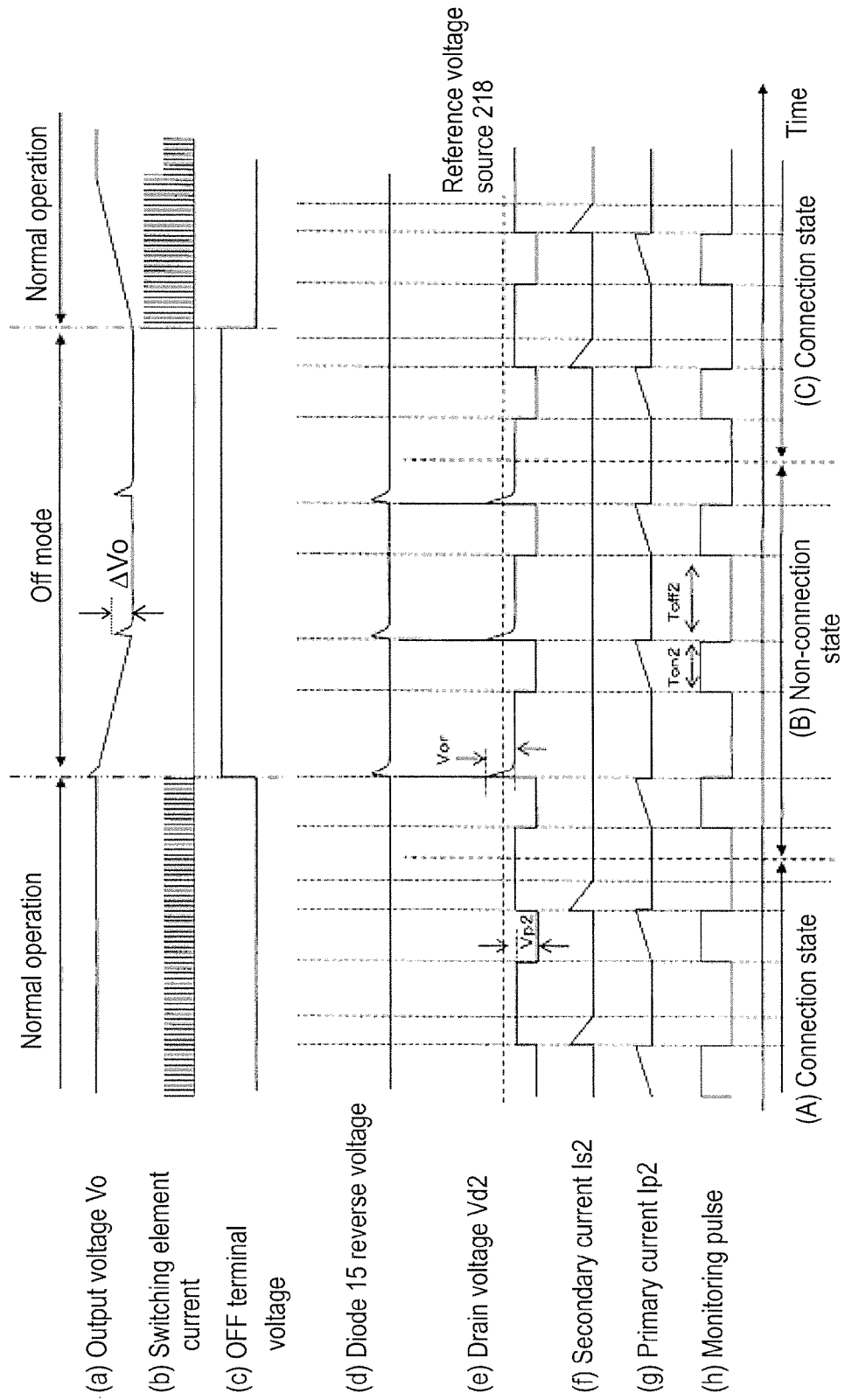
FIG. 6B is a timing chart illustrating operation of the switching power supply apparatus according to the third exemplary embodiment of the present disclosure.

FIG. 6B is a timing chart illustrating operation of the switching power supply apparatus according to the third exemplary embodiment in FIG. 4B.

A case where output terminal 16 and load device 400 are in a connection state is described (period (A) in FIG. 6B).

In a case where output terminal 16 and load device 400 are connected, a closed circuit including the secondary winding wire of transformer 205, load device 400, and a secondary winding wire of transformer 301 is formed, and impedance Z2 by load device 400 exists.

When a monitoring pulse ((h) in FIG. 6B) output from pulse generator 203 is input to a gate of switching element 204, and switching element 204 is brought into a conductive state, primary current Ip2 flows in primary winding wire 210a ((g) in FIG. 6B). Then, during period Ton2 in which the monitoring pulse is input to the gate of switching element 204, exciting energy Ep2 is stored in primary winding wire 210a. Then, when switching element, 204 is brought into a non-conductive state, exciting energy Ep2 stored in primary winding wire 210a is transmitted to a secondary side through secondary winding wire 210b.

At this time, secondary current Is2, which flows in secondary winding wire 210b, flows in load device 400 ((f) in FIG. 6B), and therefore voltage Vs2 is not generated. Reflector voltage Vor is not generated in primary winding wire 210a ((e) in FIG. 6B), and therefore device connection state detection circuit 200B recognizes a connection state, and switching operation continues ((b) in FIG. 6B).

Now a case where output terminal 16 and load device 400 shift to a non-connection state is described (period shifted from (A) to (B) in FIG. 6A, FIG. 6B, FIG. 6C, and FIG. 6D).

When output terminal 16 and load device 400 shift from the connection state to the non-connection state, the closed circuit including secondary winding wire 210b and load device 400 becomes an open circuit. Therefore, impedance Z between terminals included in output terminal 16 may be considered as Z=∞, and therefore secondary current Is becomes Is=0. At this time, a reverse voltage is generated in diode 15 ((d) in FIG. 6D), and reflector voltage Vor is generated in secondary winding wire 210b. When ΔVo denotes an output voltage rise amount caused by exciting energy Ep2 by device connection state detection circuit 200B and diode 18, the following relational expressions are established.

$$Vor=(Ns/Np)\cdot(\Delta Vo+Vfd) \qquad \text{(Expression 14)}$$

When an impedance of load device 400 is defined as capacitance Cpc, exciting energy Ep2 is expressed as follows:

$$Ep2=(Cpc/2)\cdot\Delta Vo^2 \qquad \text{(Expression 15)}$$

(Expression 14) expresses a difference from (Expression 11) in the second exemplary embodiment.

As shown in (Expression 14), in the switching power supply apparatus of the third exemplary embodiment, reflector voltage Vor does not include a term of output voltage Vo.

In a case where load device 400 is in the connection state, exciting energy Ep2 is set to be sufficiently smaller than capacitance Cpc, and therefore ΔVo becomes sufficiently smaller than output voltage Vo.

In a case where load device 400 is in the non-connection state, capacitance between the terminals included in output terminal 16 is only parasitic capacitance, and therefore ΔVo becomes relatively large, and appears a spike-like voltage as illustrated in (a) in FIG. 6B.

Thus, even in a case where there is no power on the secondary side of the switching power supply apparatus, or in a primary battery or a secondary battery mounted, on load device 400, the switching power supply apparatus of this exemplary embodiment can detect the connection state of output terminal 16 and load device 400, and off mode control of the switching power supply apparatus can be performed, similar to the second exemplary embodiment.

Furthermore, compared to the second exemplary embodiment, device connection state detection circuit 200B is not influenced by energy supplied from switching control circuit 100 and input/output conversion circuit 300, and therefore it is possible to perform connection of load device 400 and detection of the non-connection state with high precision.

Fourth Exemplary Embodiment

Now, a switching power supply apparatus of a fourth exemplary embodiment of the present disclosure is described.

The switching power supply apparatus according to the fourth exemplary embodiment is different in a configuration of device connection state detection circuit 200E.

Figure 4C:
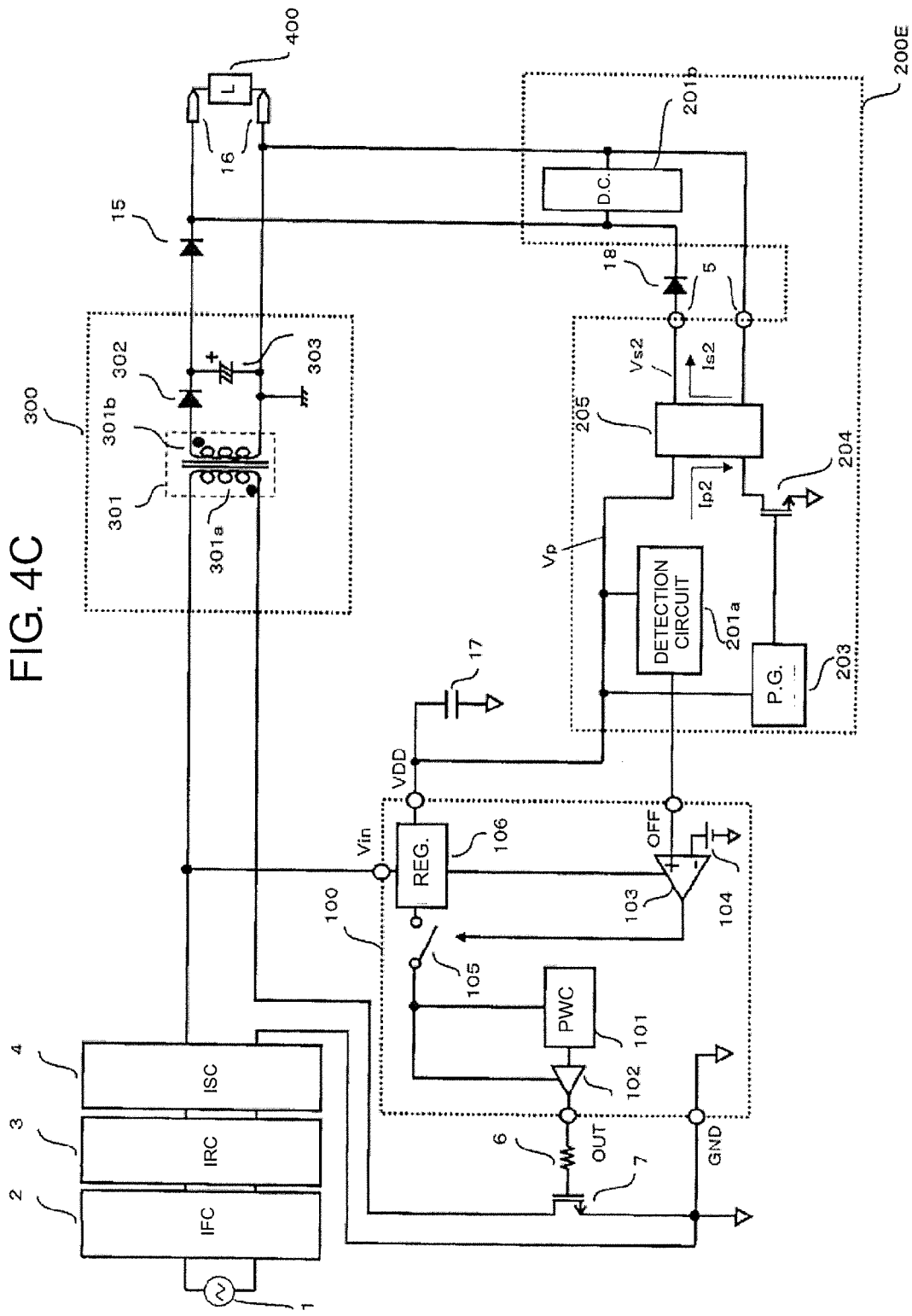
FIG. 4C is a circuit diagram illustrating a configuration example of a switching power supply apparatus and a device connection state detection circuit according to a fourth exemplary embodiment of the present disclosure.

FIG. 4C illustrates an example of the switching power supply apparatus according to the fourth exemplary embodiment.

Hereinafter, components identical with the components of the switching power supply apparatus of the second exemplary embodiment illustrated in FIG. 4A are denoted by the same reference numerals, description of these components is omitted, and operation of a point different from the second exemplary embodiment is mainly described.

Device connection state detection circuit 200E includes, for example, load device connection terminal 5, waveform detection circuit (transmitter) 201b, waveform detection circuit (receiver) 201a, transformer 205, pulse generator 203, and switching element 204, as illustrated in FIG. 4C.

Waveform detection circuit (transmitter) 201b includes, for example, a shunt regulator and a photodiode. When a voltage input to the waveform detection circuit becomes larger than a set value, a light-load detection signal is output to waveform detection circuit (receiver) 201a through the photodiode. Waveform detection circuit (receiver) 201a includes a phototransistor, and inputs a light-load detection signal to an OFF terminal.

Thus, the fourth exemplary embodiment is different from the second exemplary embodiment in that the waveform detection circuit is separated into waveform detection circuit (receiver) 201a and waveform detection circuit (transmitter) 201b, and a connection state and a non-connection state of load device 400 are directly detected on a secondary side.

Figure 6C:
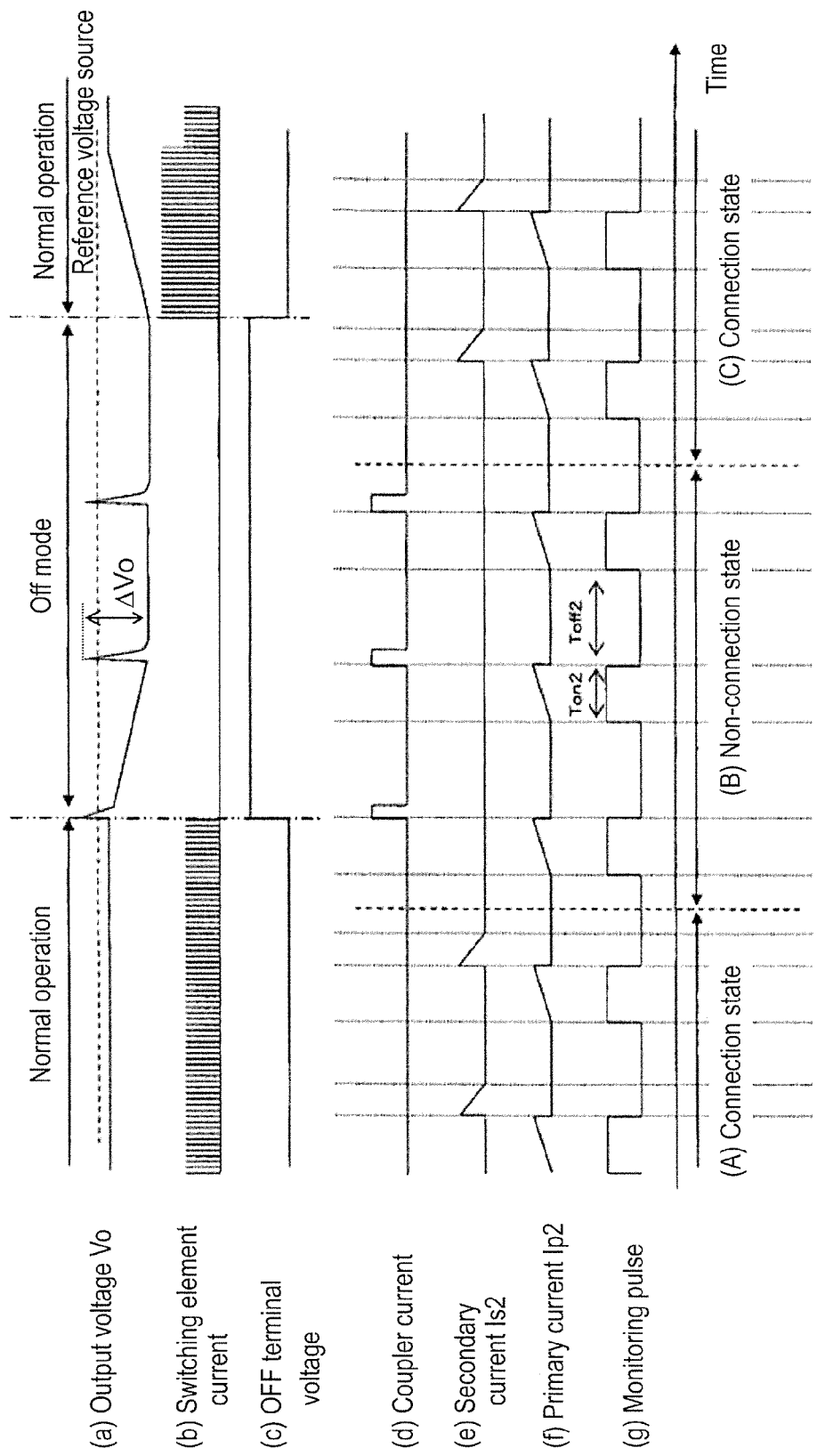
FIG. 6C is a timing chart illustrating operation of the switching power supply apparatus according to the fourth exemplary embodiment of the present disclosure.

FIG. 6C is a timing chart illustrating operation of the switching power supply apparatus according to the fourth exemplary embodiment in FIG. 4C. In fourth exemplary embodiment, the connection state and the non-connection state of load device 400 are determined by comparison with a reference level set with respect to output voltage Vo.

When a monitoring pulse ((g) in FIG. 6C) output from pulse generator 203 is input to a gate of switching element 204, and switching element 204 is brought into a conductive state, primary current Ip2 flows in primary winding wire 210a ((f) in FIG. 6C). Then, during period Ton2 in which the monitoring pulse is input to the gate of switching element 204, exciting energy Ep2 is stored in primary winding wire 210a. Then, when switching element 204 is brought into the non-conductive state, exciting energy Ep2 stored in primary winding wire 210a is transmitted to the secondary side through secondary winding wire 210b.

At this time, secondary current Is2 flows in secondary winding wire 210b ((e) in FIG. 6C).

When the load device is in the non-connection state, a pulse voltage is generated in output voltage Vo ((a) in FIG. 6C) in synchronization with this secondary current. When this pulse voltage exceeds the set reference voltage of waveform detection circuit (transmitter) 201b, a coupler current flows in the photocoupler ((d) in FIG. 6C), and light is emitted by the photocoupler to be transmitted to waveform detection circuit (receiver) 201a.

That is, even in a case where there is no power of a primary battery or a secondary battery on the secondary side, the photocoupler emits light by a pulse voltage supplied to the waveform detection circuit on the secondary side, and detection of a load device connection state is performed, and therefore it is possible to perform detection with high precision.

Figure 4D:
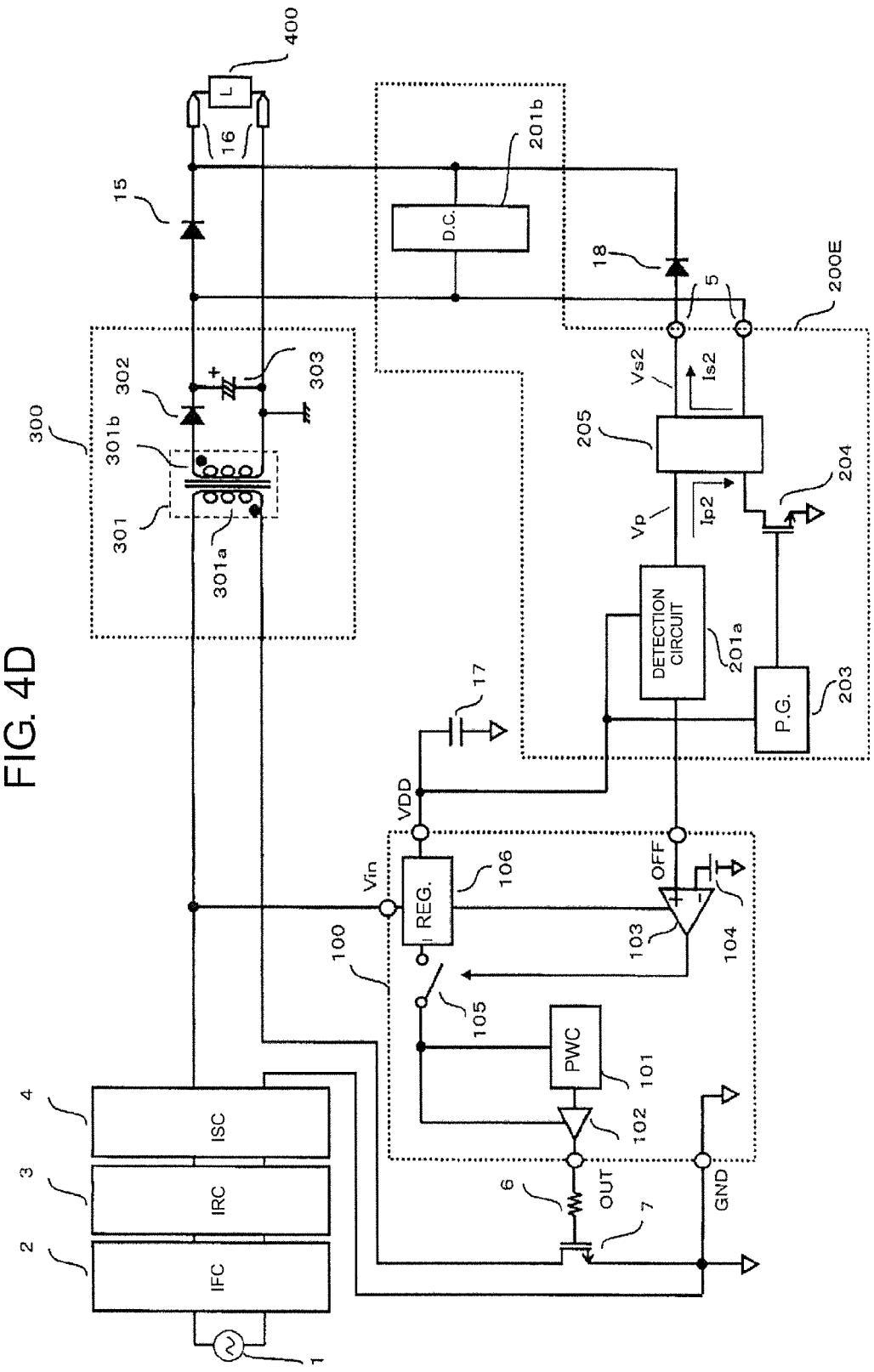
FIG. 4D is a circuit diagram illustrating a configuration example of a switching power supply apparatus and a device connection state detection circuit according to another example of the fourth exemplary embodiment of the present disclosure.

Furthermore, FIG. 4D illustrates another example of the fourth exemplary embodiment.

FIG. 6D is a timing chart illustrating operation of the switching power supply apparatus of the fourth exemplary embodiment in FIG. 4D.

Similarly to the third exemplary embodiment, in load device connection terminal 5 of device connection state detection circuit 200E, a first end is connected to a side of a cathode of diode 15 being a first rectifier circuit through diode 18 being a second rectifier circuit, namely, is connected to a connecting point with output terminal 16, and a second end is connected to a side of an anode of diode 15 being the first rectifier circuit.

That is, device connection state detection circuit 200E is connected to both ends of diode 15, so that a potential difference (reverse voltage) that appears in the both ends of diode 15 is detected.

Thus, similarly to the third exemplary embodiment, in the switching power supply apparatus of this exemplary embodiment, device connection state detection circuit 200E is not influenced by exciting energy supplied, from switching control circuit 100 and input/output conversion circuit 300, and therefore it is possible to detect the connection state and the non-connection state of load device 400 with higher precision.

Fifth Exemplary Embodiment

Now, a switching power supply apparatus of a fifth exemplary embodiment of the present disclosure is described.

The switching power supply apparatus according to the fifth exemplary embodiment is different from the first exemplary embodiment in a configuration of switching control circuit 150, and additional placement of output voltage detection circuit 20 and photocoupler 19.

Figure 9:
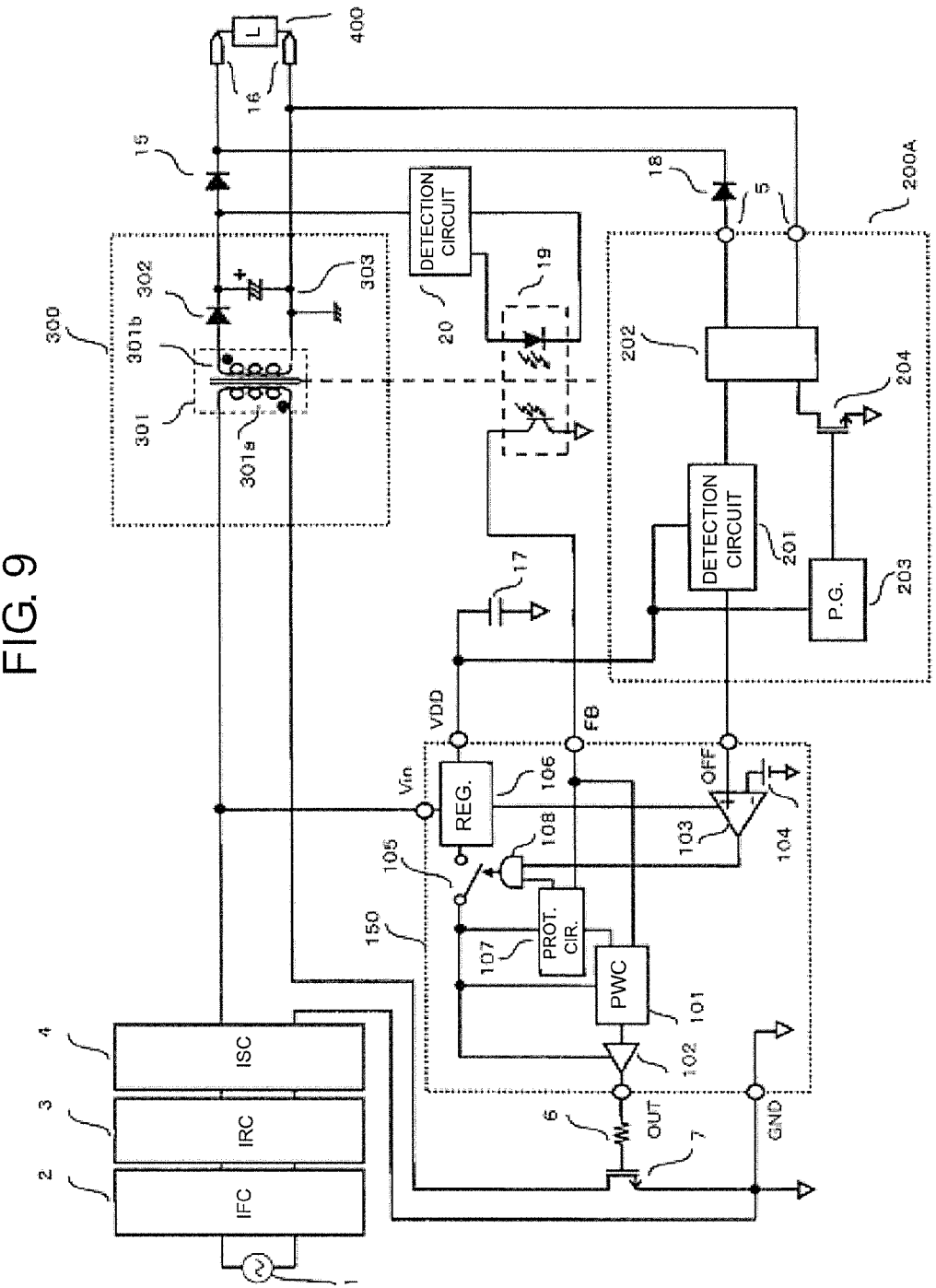
FIG. 9 is a circuit diagram illustrating a configuration example of a switching power supply apparatus and a device connection state detection circuit according to a fifth exemplary embodiment of the present disclosure.

FIG. 9 illustrates an example of the switching power supply apparatus according to the fifth exemplary embodiment.

Switching control circuit 150 is different from switching control circuit 100 in FIG. 1, in addition of protective circuit 107, AND circuit 108, and an FB terminal, and connection of an output destination of off-mode detector 103.

The FB terminal is a terminal for receiving a feedback signal output from output voltage detection circuit 20, through photocoupler 19, and controlling switching operation.

Output voltage detection circuit 20 is connected to an output voltage line of input/output conversion circuit 300, and generates a feedback signal in accordance with an output voltage value.

Protective circuit 107 is connected to pulse width control circuit 101, AND circuit 108, and regulator 106.

Output of off-mode detector 103 is input to AND circuit 108.

Hereinafter, components identical with the components of the switching power supply apparatus of the first exemplary embodiment illustrated in FIG. 1 are denoted by the same reference numerals, description of these components is omitted, and operation of a point different from the first exemplary embodiment is mainly described.

When the output voltage value becomes not less than a specified voltage set by output voltage detection circuit 20, output voltage detection circuit 20 performs control such that a current flows out from the FB terminal of switching control circuit 150 as a feedback signal. By this feedback signal, pulse width control circuit 101 changes, for example, on-duty of switching element 7 to a suitable state, and maintains the output voltage at the specified voltage.

Additionally, in a case where an output voltage on a secondary side of input/output conversion circuit 300 becomes abnormally higher or lower than a specified output value during normal operation, for example, in a case where input/output conversion circuit 300 is set so as to output 20 V, when 40 V (overvoltage) or 0 V (overload) is output, a feedback signal is generated to be input to the FB terminal through photocoupler 19. Furthermore, this feedback signal is input to protective circuit 107, and protective circuit 107 controls pulse width control circuit 101 to stop switching operation of switching element 7.

Herein, a difference between shift to an off mode during normal operation and shift to an off mode during protective operation is described.

First, the shift to the off mode during normal operation is described.

FIG. 10A is a timing chart illustrating operation during normal operation of the switching power supply apparatus according to the fifth exemplary embodiment of the present disclosure.

During normal operation, when device connection state detection circuit 200A detects that output terminal 16 and load device 400 are in a connection state, a voltage lower than a voltage of reference voltage source 104 of off-mode detector 103 is input to an OFF terminal ((f) in FIG. 10A), and off-mode detector 103 inputs an L level, signal to AND circuit 108 ((d) in FIG. 10A). Additionally, protective circuit 107 inputs an H level signal ((e) in FIG. 10A) to AND circuit 108. Then, the L level signal is input to AND circuit 108, and therefore AND circuit 108 outputs the L level signal ((c) in FIG. 10A), switching control circuit 150 controls off-mode switch 105 to be in a conductive state, and maintains switching operation of switching element 7, and the switching power supply apparatus continues the normal operation.

When device connection state detection circuit 200A detects that output terminal 16 and load device 400 is in a non-connection state, a voltage higher than the voltage of reference voltage source 104 of off-mode detector 103 is input to the OFF terminal, and off-mode detector 103 inputs an H level signal to AND circuit 108. Protective circuit 107 inputs the H level signal to AND circuit 108 during normal operation, and therefore AND circuit 108 outputs the H level signal, and switching control circuit 150 controls off-mode switch 105 to be in an interruption state.

Then, switching operation of switching element 7 stops ((b) in FIG. 10A), and the switching power supply apparatus shifts to an off mode. Then, output voltage Vo ((a) in FIG. 10A) lowers to 0 V. Then, power supply to a circuit block unnecessary for operation, including protective circuit 107 inside switching control circuit 150 is interrupted, and power consumption of the switching power supply apparatus is reduced.

Now, operation during protective operation is described.

Figure 10B:
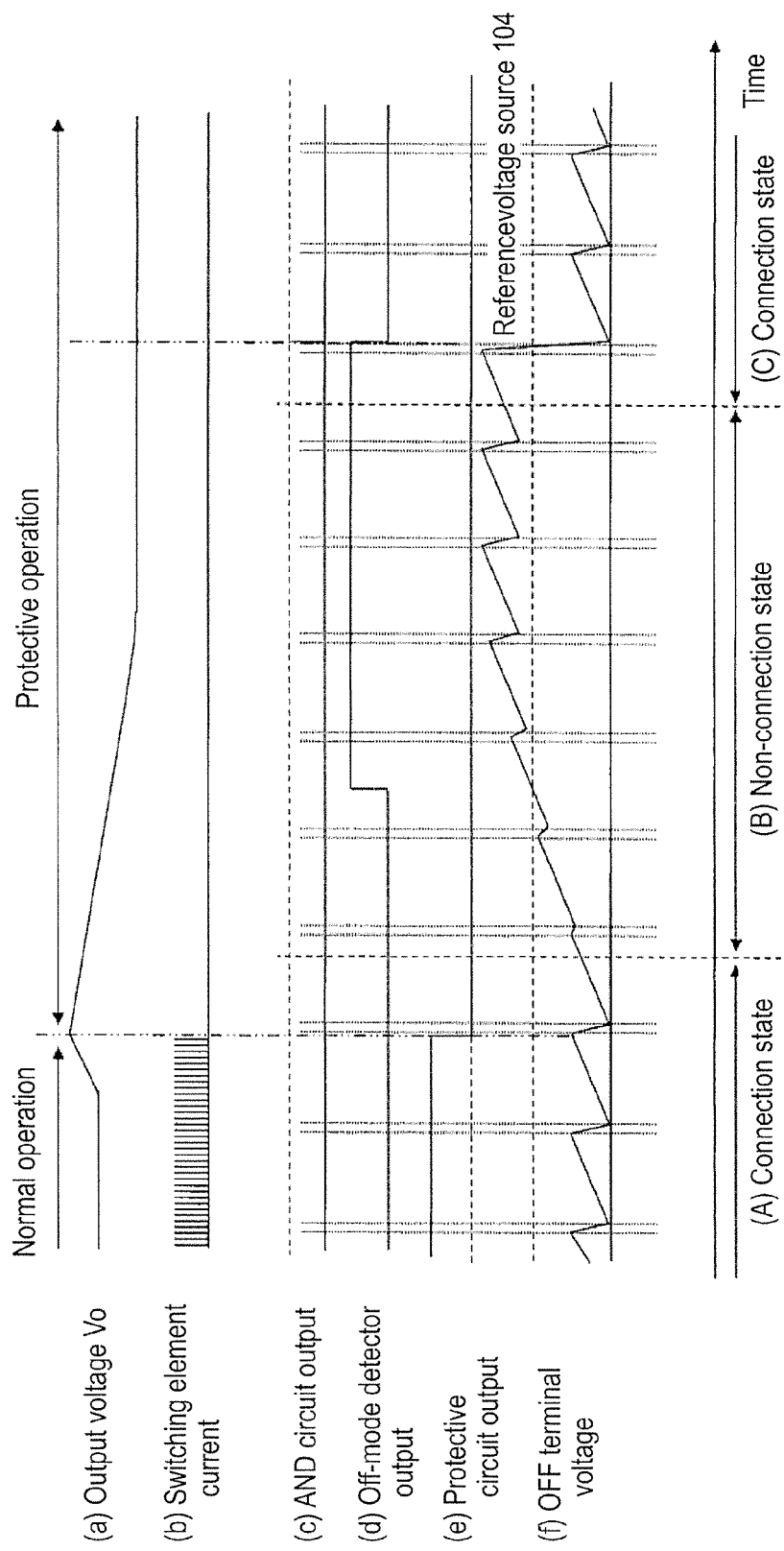
FIG. 10B is a timing chart illustrating operation during protective operation of the switching power supply apparatus according to the fifth exemplary embodiment of the present disclosure.

FIG. 10B is a timing chart illustrating operation during protective operation of the switching power supply apparatus according to the fifth exemplary embodiment of the present disclosure.

When output voltage Vo ((a) in FIG. 10B) becomes higher than the specified output value, and protective circuit 107 detects an abnormal condition, switching control circuit 150 performs control so as to stop switching operation of switching element 7 ((b) in FIG. 10B), and output voltage VO lowers to 0 V. Furthermore, protective circuit 107 inputs an L level signal to AND circuit 108 ((e) in FIG. 10B), and therefore AND circuit 108 outputs the L level signal regardless of a signal input from off-mode detector 103 ((c) in FIG. 10B). Then, switching control circuit 150 always maintains off-mode switch 105 to be in a conductive state. Therefore, even when device connection state detection circuit 200A detects that output terminal 16 and load device 400 are brought into the non-connection state, a voltage higher than the voltage of reference voltage source 104 of off-mode detector 103 is input to the OFF terminal ((f) in FIG. 10B), and off-mode detector 103 outputs an H level signal ((d) in FIG. 10B), switching control circuit 150 maintains a protective state by protective circuit 107.

Thus, in the switching power supply apparatus of this exemplary embodiment, in a case of the shift to the off mode during normal operation, power supply to the circuit block unnecessary for operation, including protective circuit 107 inside switching control circuit 150 is interrupted, and power consumption of switching control circuit 150 itself is reduced. Furthermore, in a case where an abnormal condition is detected, operation is controlled so as not to shift to the off mode, so that a protective state is maintained, and stability of the switching power supply apparatus can be secured.

Protective circuit 107 may detect that a temperature of the device connection state detection circuit abnormally rises, and switching control circuit 150 may be controlled to stop the switching operation of switching element 7.

Sixth Exemplary Embodiment

Now, a switching power supply apparatus of a sixth exemplary embodiment of the present disclosure is described.

The switching power supply apparatus according to the sixth exemplary embodiment is different from the switching power supply apparatus according to the fifth exemplary embodiment in a configuration of switching control circuit 151.

Figure 11:
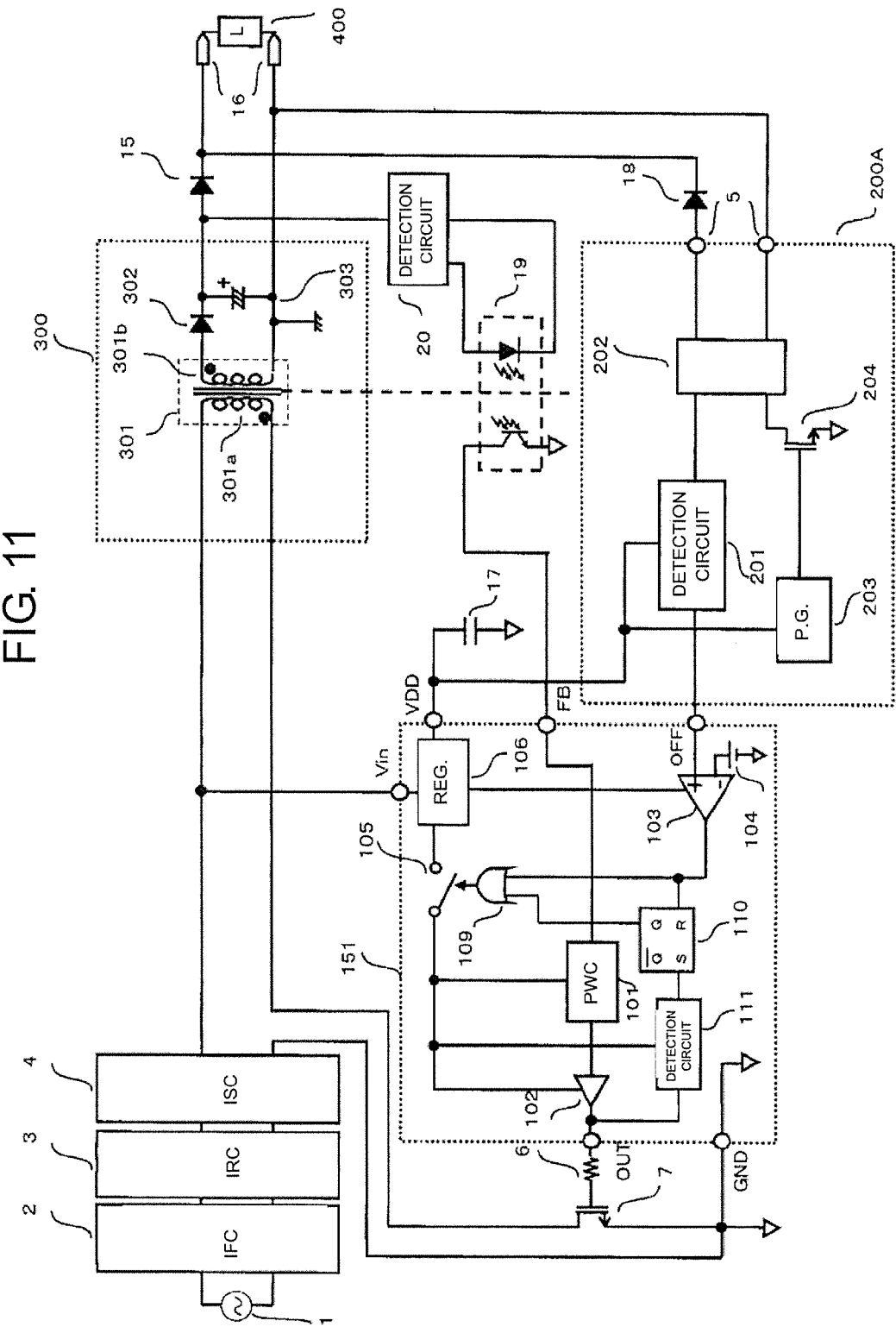
FIG. 11 is a circuit diagram illustrating a configuration example of a switching power supply apparatus and a device connection state detection circuit according to a sixth exemplary embodiment of the present disclosure.

FIG. 11 illustrates an example of the switching power supply apparatus according to the sixth exemplary embodiment.

Switching control circuit 151 is different from switching control circuit 150 in FIG. 9 in that protective circuit 107 and AND circuit 108 are not disposed, and OR circuit 109, RS latch circuit 110, and time detection circuit 111 are disposed.

Time detection circuit 111 is disposed in order to detect a driving signal of drive circuit 102, and is connected to an output part of drive circuit 102, and a set terminal (S-terminal) of RS latch circuit 110, and regulator 106.

RS latch circuit 110 is a NOR RS latch circuit, and output of off-mode detector 103 is input to a reset terminal (R-terminal), output of time detection circuit 111 is connected to the set terminal (S-terminal), and an output terminal (Q-terminal) is connected to OR circuit 109.

Hereinafter, components identical with the components of the switching power supply apparatus of the fifth exemplary embodiment illustrated in FIG. 9 are denoted by the same reference numerals, description of these components is omitted, and operation of a point different from the fifth exemplary embodiment is mainly described.

Additionally, operation of device connection state detection circuit 200A is described in the first exemplary embodiment, and therefore is omitted herein.

When time detection circuit 111 detects a driving signal of drive circuit 102 and does not detect the driving signal for a fixed period, time detection circuit 111 generates a light-load detection signal to input the light-load detection signal to the S-terminal of RS latch circuit 110. The light-load detection signal is a pulse signal.

Hereinafter, a case where output terminal 16 and load device 400 are in a connection state, a case where output terminal 16 and load device 400 shift to a non-connection state, and a case where output terminal 16 and load device 400 shift to a connection state are described.

Figure 12:
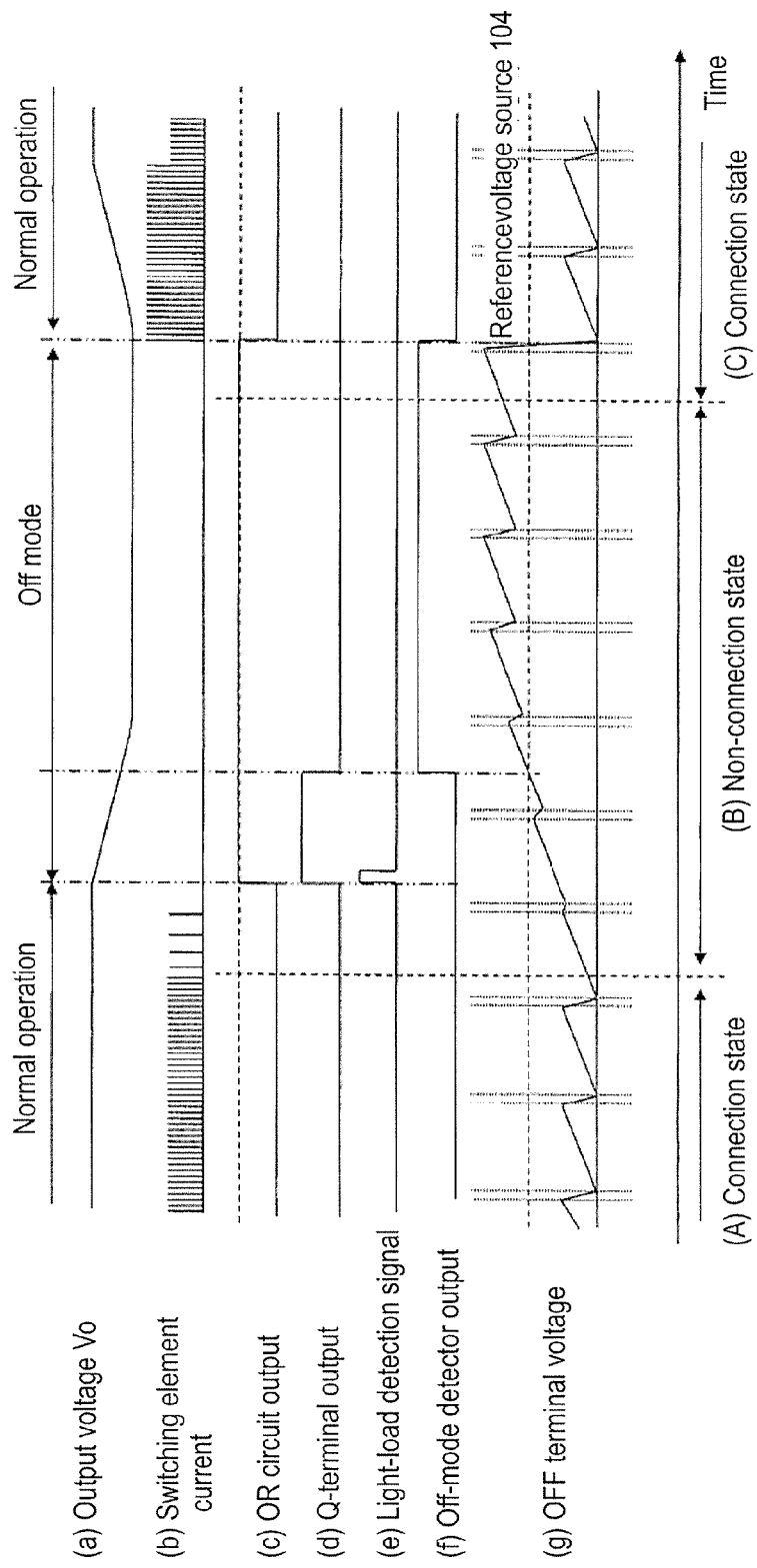
FIG. 12 is a timing chart illustrating operation of the switching power supply apparatus according to the sixth exemplary embodiment of the present disclosure.

FIG. 12 is a timing chart illustrating operation of the switching power supply apparatus in FIG. 11.

The case where output terminal 16 and load device 400 are in the connection state is described (period (A) in FIG. 12).

In this period, a switching element current ((b) in FIG. 12) flows at regular intervals, namely, driving signals are output from drive circuit 102 at regular intervals. At this time, time detection circuit 111 outputs an L level signal. This L level signal is input to the S-terminal of RS latch circuit 110.

At this time, device connection state detection circuit 200A performs control such that an OFF terminal voltage ((g) in FIG. 12) of off-mode detector 103 becomes lower than a voltage of reference voltage source 104, and therefore off-mode detector 103 outputs an L level signal ((f) in FIG. 12). This L level signal is input to the R-terminal of RS latch circuit 110.

Then, an L level signal is output from the Q-terminal of RS latch circuit 110. Then, this L level signal is input to OR circuit 109.

Furthermore, the L level signal output from off-mode detector 103 is also input to OR circuit 109, and OR circuit 109 outputs the L level signal.

Then, switching control circuit 151 controls off-mode switch 105 to be in a conductive state, and maintains switching operation of switching element 7 and the switching power supply apparatus continues normal operation.

Now, the case where output terminal 16 and load device 400 shift to the non-connection state is described (period shifted from (A) to (B) in FIG. 12).

When output terminal 16 and load device 400 are brought into the non-connection state, a load current is not supplied from input/output conversion circuit 300 to load device 400. Then, by a feedback signal output from output voltage detection circuit 20, pulse width control circuit 101 controls the switching such that a switching cycle of switching element 7 increases through drive circuit 102.

When a driving signal output from drive circuit 102 is not detected for the fixed period, time detection circuit 111 outputs a light-load detection signal ((e) in FIG. 12). At this time, device connection state detection circuit 200A performs control such that the OFF terminal voltage ((g) in FIG. 12) is lower than the voltage of reference voltage source 104, and therefore an L level signal is output from off-mode detector 103. As a result, the light-load detection signal is input to the S-terminal of RS latch circuit 110, and the L level signal is input to the R-terminal, and therefore an H level signal is output from the Q-terminal ((d) in FIG. 12).

Furthermore, the H level signal from Q-terminal, and the L level, signal from off-mode detector 103 are input to OR circuit 109, and therefore an H level signal is output from OR circuit 109 ((c) in FIG. 12). As a result, switching control circuit 151 brings off-mode switch 105 into an interruption state, and stops switching operation of switching element 7, and the switching power supply apparatus shifts to an off mode. Then, output voltage Vo ((a) in FIG. 12) lowers to 0 V.

Furthermore, when device connection state detection circuit 200A performs control such that the OFF terminal voltage becomes larger than the voltage of reference voltage source 104, an H level signal is input from off-mode detector 103 to the R-terminal of RS latch circuit 110. As a result, the Q-terminal of RS latch circuit 110 outputs an L level signal. Then, an L level signal from the Q-terminal, and an H level signal from off-mode detector 103 are input to OR circuit 109, and an H level signal is output from OR circuit 109, and therefore switching control circuit 151 maintains off-mode switch 105 to be in the interruption state, and stops the switching operation of switching element 7, and the switching power supply apparatus continues the off mode.

Now, the case where output terminal 16 and load device 400 shift to the connection state is described (period shifted from (B) to (C) in FIG. 12).

When output terminal 16 and load device 400 are brought into the connection state, device connection state detection circuit 200A performs control such that the OFF terminal voltage is lower than the voltage of reference voltage source 104. Then, an L level signal is input to each of the S-terminal and the R-terminal of RS latch circuit 110, and therefore an L level signal is output from the Q-terminal. Furthermore, the L level signal from the Q-terminal, and the L level signal from off-mode detector 103 are input to OR circuit 109, and therefore an L level signal is output from OR circuit 109. As a result, switching control circuit 151 brings off-mode switch 105 into a conductive state, and therefore starts the switching operation of switching element 7, and the switching power supply apparatus shifts to normal operation.

Thus, also in the switching power supply apparatus of this exemplary embodiment, an effect similar to the effect of the first exemplary embodiment is obtained. Furthermore, when an oscillation cycle of switching element increases, shift to the off mode is possible, and therefore the shift to the off mode is possible before the OFF terminal, voltage becomes higher than the voltage of reference voltage source 104.

Seventh Exemplary Embodiment

Now, a switching power supply apparatus of a seventh exemplary embodiment of the present disclosure is described.

The switching power supply apparatus according to the seventh exemplary embodiment is different from the switching power supply apparatus according to the first exemplary embodiment in a configuration of pulse generator 203B in device connection state detection circuit 200C.

Figure 13:
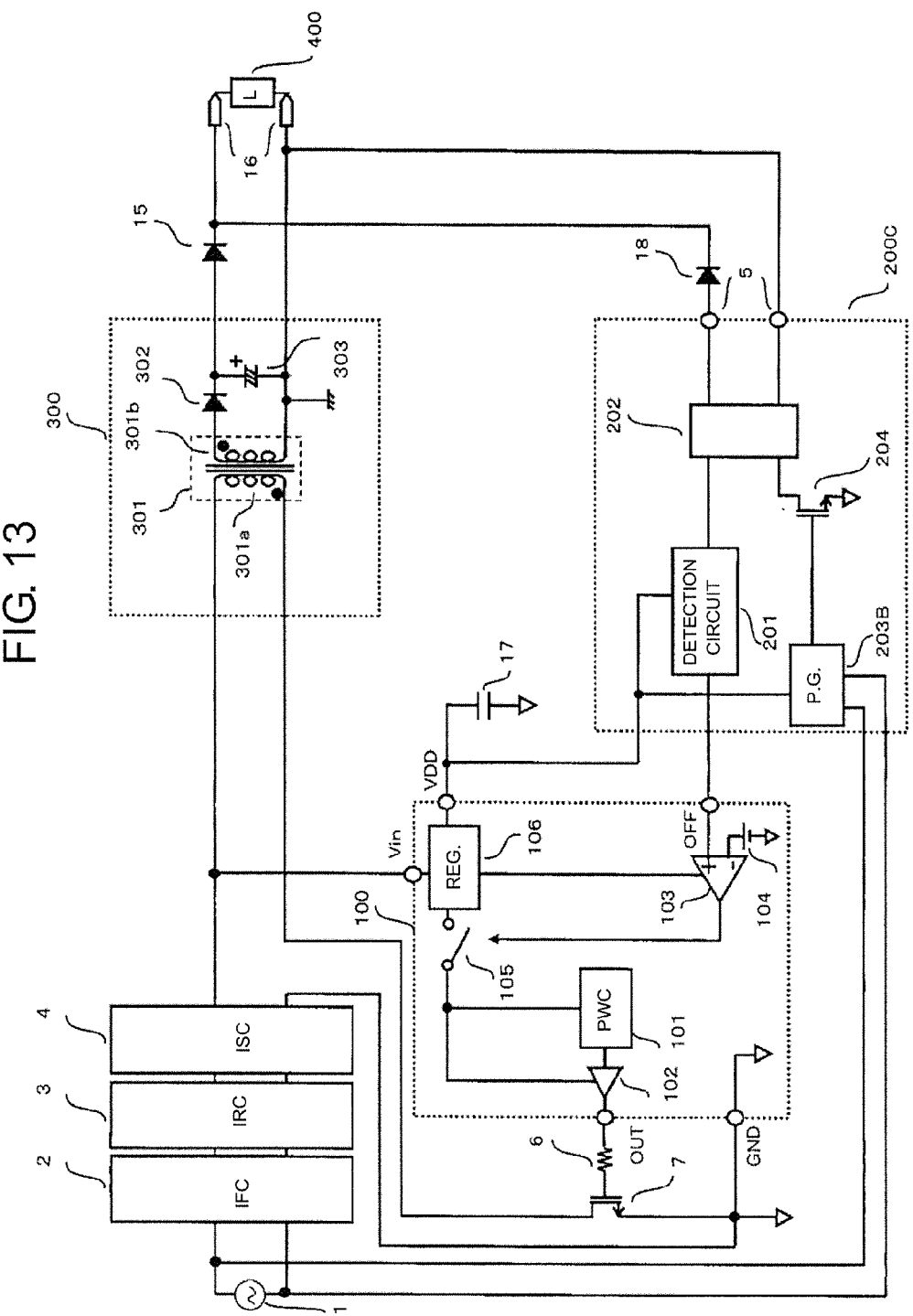
FIG. 13 is a circuit diagram illustrating a configuration example of a switching power supply apparatus and a device connection state detection circuit according to a seventh exemplary embodiment of the present disclosure.

FIG. 13 illustrates an example of the switching power supply apparatus according to the seventh exemplary embodiment.

Hereinafter, components identical with the components of the switching power supply apparatus of the first exemplary embodiment illustrated in FIG. 1 are denoted by the same reference numerals, description of these components is omitted, and operation of a point different from the first exemplary embodiment is mainly described.

Figure 14:
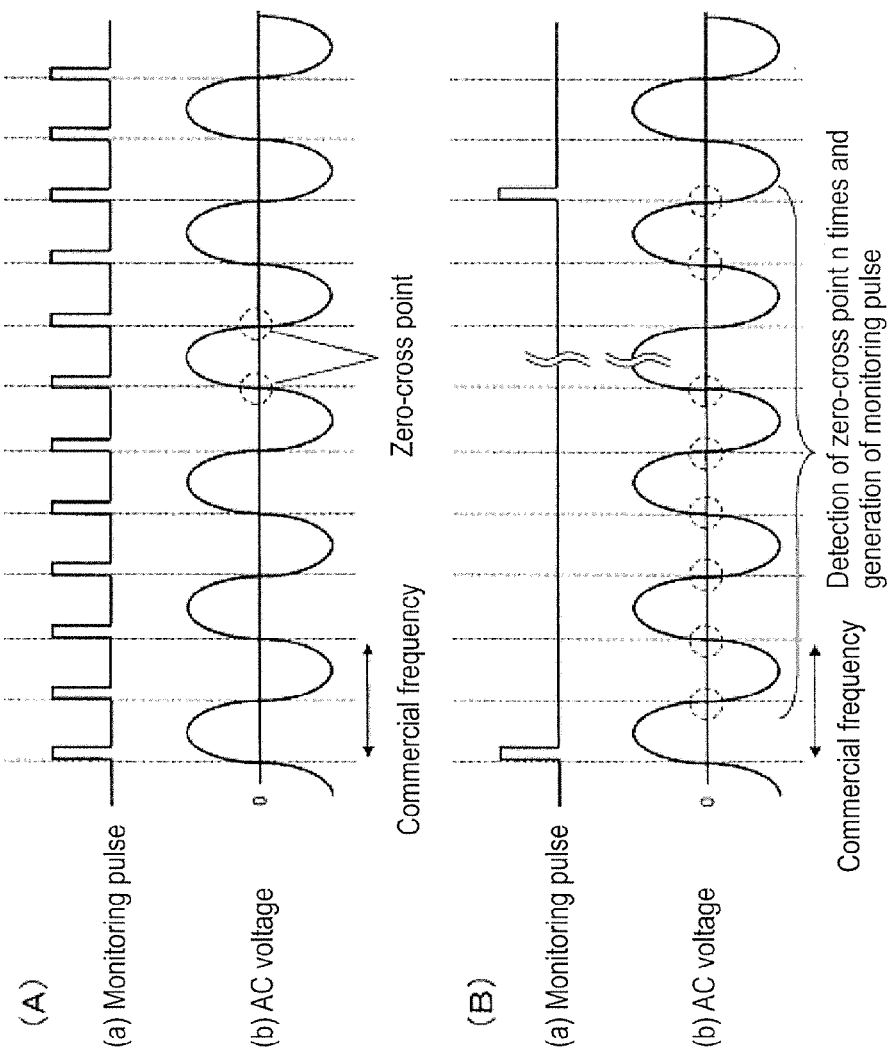
FIG. 14 is a timing chart illustrating operation of a pulse generator to the seventh exemplary embodiment of the present disclosure.

An input voltage of commercial power supply 1 is input to pulse generator 203B. Pulse generator 203B performs control so as to detect a point at which an AC voltage of a commercial frequency crosses 0 V (zero-cross point) ((b) in FIG. 14(A)), and to generate a monitoring pulse ((a) in FIG. 14(A)), as illustrated in FIG. 14(A), for example. For example, in a case where a frequency of the commercial frequency is 50 Hz, monitoring pulses are generated at an interval of 100 Hz.

As illustrated in FIG. 14(B), the pulse generator may be controlled so as to generate the monitoring pulse ((a) in FIG. 14(B)) after the zero-cross point is detected n times ((b) in FIG. 14(B)). For example, in the case where the frequency of the commercial frequency is 50 Hz, when the monitoring pulse is controlled, so as to be generated after the zero-cross point is detected 100 times, a frequency of the monitoring pulse becomes 1 Hz.

Thus, according to pulse generator 203B of this exemplary embodiment, it is possible to easily set a monitoring pulse cycle by utilization of the commercial frequency.

Eighth Exemplary Embodiment

Now, a switching power supply apparatus of an eighth exemplary embodiment of the present disclosure is described.

The switching power supply apparatus according to the eighth exemplary embodiment is different from the switching power supply apparatus according to the first exemplary embodiment in additional placement of resistor 501, off-mode control circuit 500, and photocoupler 22, and a configuration of pulse generator 203C in device connection state detection circuit 200D.

Figure 15:
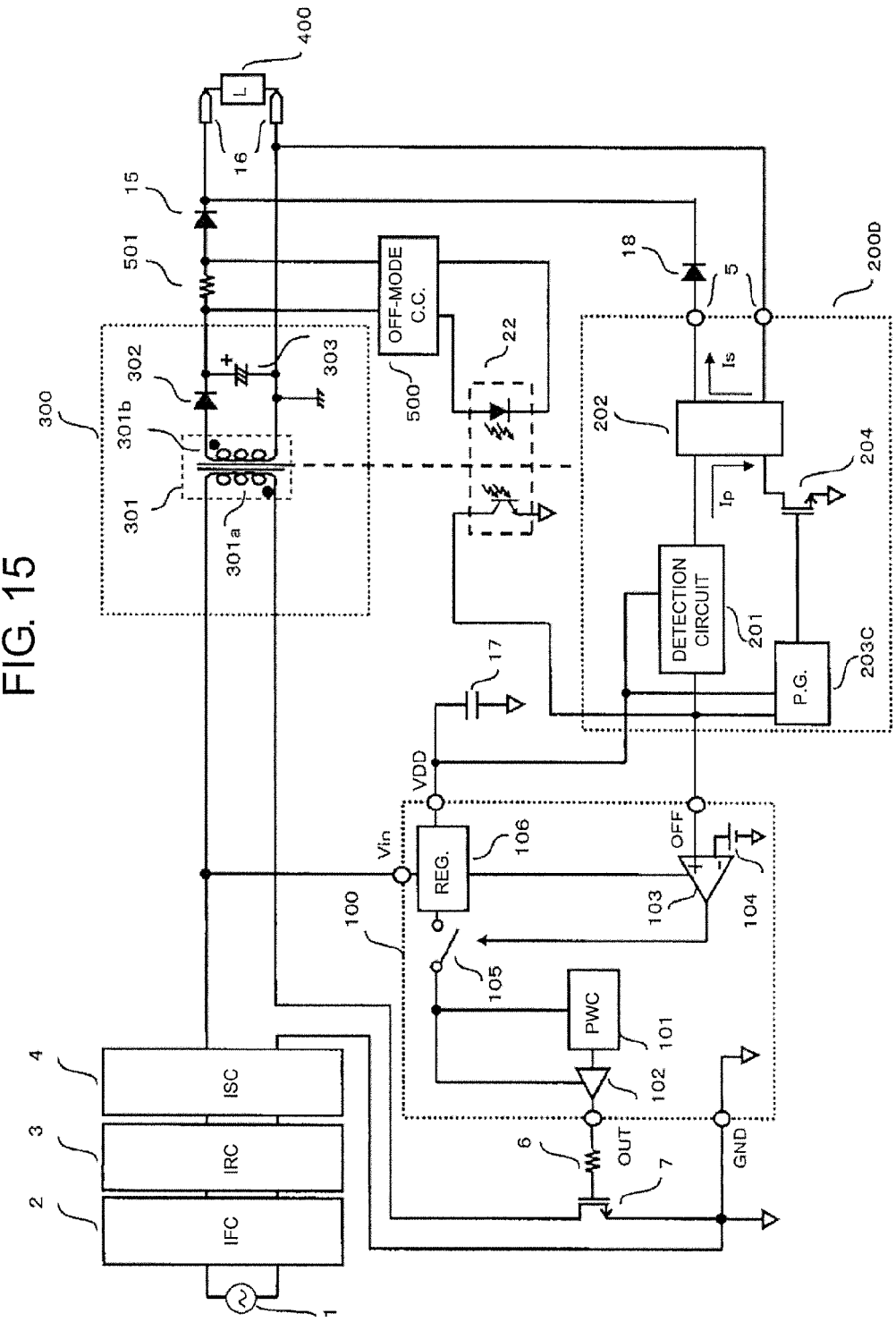
FIG. 15 is a circuit diagram illustrating a configuration example of a switching power supply apparatus and a device connection state detection circuit according to an eighth exemplary embodiment of the present disclosure.

FIG. 15 illustrates an example of the switching power supply apparatus according to the eighth exemplary embodiment.

Resistor 501 has a first end connected to a cathode of diode 302, and a second end connected to an anode of diode 15.

Off-mode control circuit 500 is connected to a connecting point of diode 302 and resistor 501, a connecting point of diode 15 and resistor 501, and photocoupler 22, and generates an off-mode release signal in accordance with power supplied from input/output conversion circuit 300 to load device 400.

Figure 16:
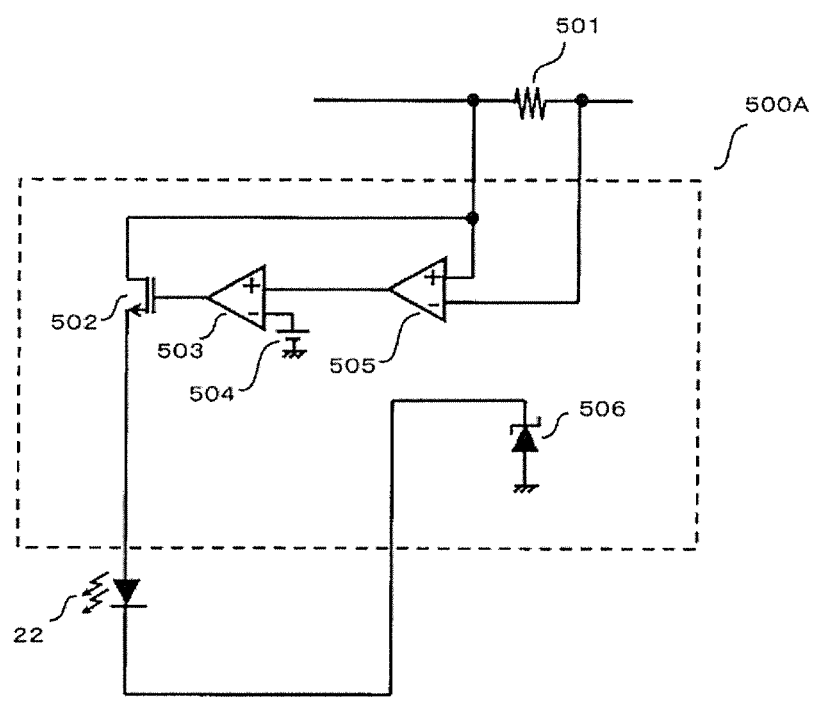
FIG. 16 is a circuit diagram illustrating a configuration example of an off-mode control circuit according to the eighth exemplary embodiment of the present disclosure.

Off-mode control circuit 500 includes, for example, voltage comparator 503, reference voltage source 504, amplifier 505, NchMOSFET 502, a Zener diode 506 like off-mode control circuit 500A in FIG. 16.

Pulse generator 203C is connected to a VDD terminal, an OFF terminal., a gate of switching element 204, and photocoupler 22.

Hereinafter, components identical with the components of the switching power supply apparatus of the first exemplary embodiment illustrated in FIG. 1 are denoted by the same reference numerals, description of these components is omitted, and operation of a point different from the first exemplary embodiment is mainly described.

Figure 17:
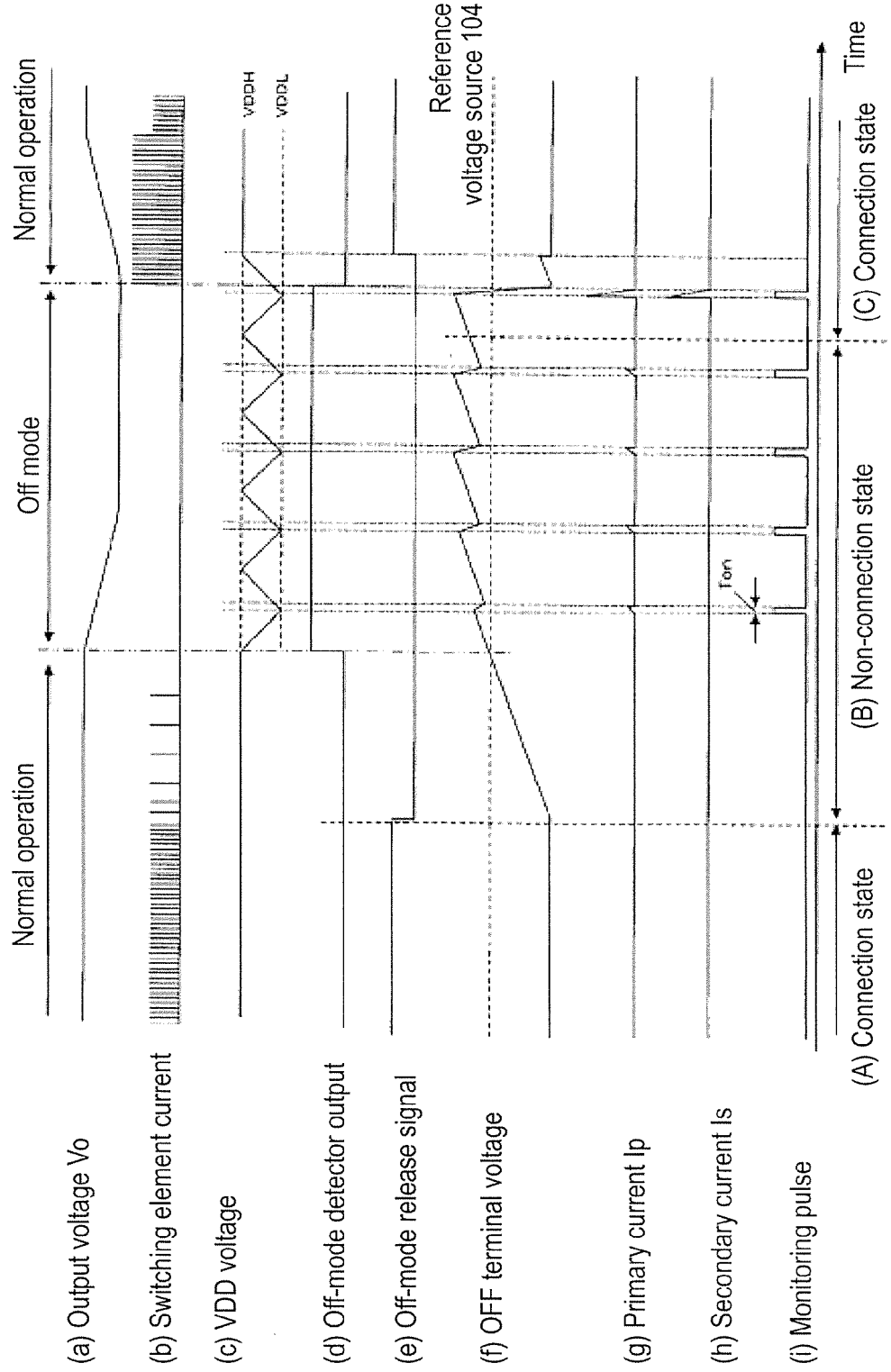
FIG. 17 is a timing chart illustrating operation of the switching power supply apparatus according to the eighth exemplary embodiment. of the present disclosure.

FIG. 17 is a timing chart illustrating operation of the switching power supply apparatus in FIG. 15.

First, a case where output terminal 16 and load device 400 are in a connection state is described (period (A) in FIG. 17).

Off-mode control circuit 500A detects a current supplied from input/output conversion circuit 300 to load device 400, by amplifier 505 through resistor 501. In a case where the supplied current is large, amplifier 505 inputs a voltage higher than a voltage of reference voltage source 504 to voltage comparator 503, voltage comparator 503 outputs an H level signal. When this H level signal is input to a gate of NchMOSFET 502, NchMOSFET 502 is bought into a conductive state, and an off-mode release signal ((e) in FIG. 17) is generated.

When the off-mode release signal is input to photocoupler 22, photocoupler 22 is operated. Electric charges stored in capacitor 208 are discharged, an OFF terminal voltage lowers ((f) in FIG. 17), and is maintained so as to be lower than a voltage of reference voltage source 104 of off-mode detector 103. Then, off-mode detector 103 outputs an L level signal ((d) in FIG. 17).

Switching control circuit 100 controls off-mode switch 105 to be in a conductive state, and maintains switching operation of switching element 7 ((b) in FIG. 17), and switching power supply apparatus continues normal operation.

When pulse generator 203C detects that the OFF terminal voltage is lower than the voltage of reference voltage source 104, a monitoring pulse is controlled so as not to be generated ((i) in FIG. 17).

Now, a case where output terminal 16 and load device 400 shift to a non-connection state is described (period, shifted from (A) to (B) in FIG. 17).

In off-mode control circuit 500A, in a case where a current supplied from input/output conversion circuit 300 to load device 400 becomes very small, for example, in a case where output terminal 16 and load device 400 are brought into a non-connection state, amplifier 505 inputs a voltage lower than the voltage of reference voltage source 504 to voltage comparator 503, and voltage comparator 503 outputs an L level signal. When this L level signal is input to the gate of NchMOSFET 502, NchMOSFET 502 is brought into a non-conductive state, generation of the off-mode release signal is stopped.

Then, operation of photocoupler 22 is stopped, electric charges are charged in capacitor 208 through resistor 206, the OFF terminal voltage rises to become higher than a voltage of reference voltage source 104 of off-mode detector 103.

As the current supplied from input/output conversion circuit 300 to load device 400 becomes smaller, pulse width control circuit 101 performs control so as to thin switching operation of switching element 7 (intermittent, operation).

As a result, switching control circuit 100 controls off-mode switch 105 to be in an interruption state, and stops the switching operation of switching element 7, and a switching power supply shifts to an off mode. Then, output voltage Vo ((a) in FIG. 17) lowers to 0 V.

When the switching power supply shifts to the off mode, regulator 106 stops current supply to the VDD terminal ((c) in FIG. 17). Then, when a VDD terminal voltage lowers to VDDL, control is performed such that current supply is started. When the VDD terminal voltage reaches VDDH, current supply is stopped again.

By such control, power consumed by switching control circuit 100 during the off anode can be reduced.

Pulse generator 203C detects that the OFF terminal voltage is higher than the voltage of reference voltage source 104, and starts generating a monitoring pulse when the VDD terminal voltage reaches VDDL.

A generation cycle of the monitoring pulse is determined by a capacitance value of capacitor 17, a current supply amount to capacitor 17, and a discharge current from capacitor 17. The capacitance value of capacitor 17 is regulated, so that it is possible to generate a monitoring pulse of a long cycle.

When generation of the monitoring pulse is started, electric charges stored in capacitor 208 are discharged by primary current Ip ((g) in FIG. 17) flowing in primary winding wire 209a. However, a turn ratio (Np/Ns) of transformer 202, on time Ton of the monitoring pulse, and an L value of primary winding wire 209a are regulated, so that a lower limit value of the OFF terminal voltage is set not to be below the voltage of reference voltage source 104 of off-mode detector 103, thereby maintaining the off mode.

Now, a case where output terminal 16 and load device 400 shift to a connection state is described (period shifted from (B) to (C) in FIG. 17).

When output terminal 16 and load device 400 are brought into the connection state, and thereafter a monitoring pulse is generated from pulse generator 203C to be input to the gate of switching element 204, switching element 204 is brought into a conductive state, secondary current Is ((h) in FIG. 17) flows, and is synthesized to become primary current Ip. Electric charges charged in capacitor 208 are discharged by this primary current Ip. When the OFF terminal voltage lowers to become lower than the voltage of reference voltage source 104 of off-mode detector 103, pulse generator 203C stops generating the monitoring pulse. Furthermore, switching control circuit 100 controls off-mode switch 105 to be in a conductive state, and starts switching operation of switching element 7.

When off-mode control circuit 500A detects that power supplied, from input/output conversion circuit 300 to load device 400 becomes large, and output voltage Vo rises to become larger than a Zener voltage of Zener diode 506, an off-mode release signal is generated.

The off-mode release signal is input to photocoupler 22, and photocoupler 22 operates. Photocoupler 22 discharges electric charges stored in capacitor 208, and the OFF terminal voltage lowers, and is maintained so as to be lower than the voltage of reference voltage source 104 of off-mode detector 103.

As a result, switching control circuit 100 controls off-mode switch 105 to be in a conductive state, and maintains the switching operation of switching element 7, and the switching power supply apparatus continues normal operation.

Zener diode 506 is installed in order to perform control so as not to generate an off-mode release signal when output voltage Vo does not rise to a fixed value or more. For example, in a case of unstable operation where the output voltage does not rise to the fixed value or more, the off-mode release signal is not generated, and therefore when the OFF terminal voltage becomes larger than the voltage of reference voltage source 104, the switching operation of switching element 7 is stopped. Consequently, at startup, or in a case where abnormality occurs when the off mode is shifted to normal operation, it is possible to avoid unstable operation, and to bring the switching power supply apparatus into a stopped state.

Thus, in the switching power supply of this exemplary embodiment, it is possible to stop pulse generation of the monitoring pulse during normal operation. Additionally, it is possible to suppress power consumed by the pulse generator, when power supplied from input/output conversion circuit 300 to load device 400 is small, for example, during normal operation. Furthermore, it is possible to easily set a generation cycle of the monitoring pulse during an off mode.

Ninth Exemplary Embodiment

Now, a switching power supply apparatus of a ninth exemplary embodiment of the present disclosure is described.

The switching power supply apparatus according to the ninth exemplary embodiment is different from the switching power supply apparatus according to the first exemplary embodiment in a configuration where diode 15 and diode 18 are not disposed, a configuration of output terminal 16A, a configuration of load device 400A, and connection of transformer 202 and output terminal 16A.

Figure 18:
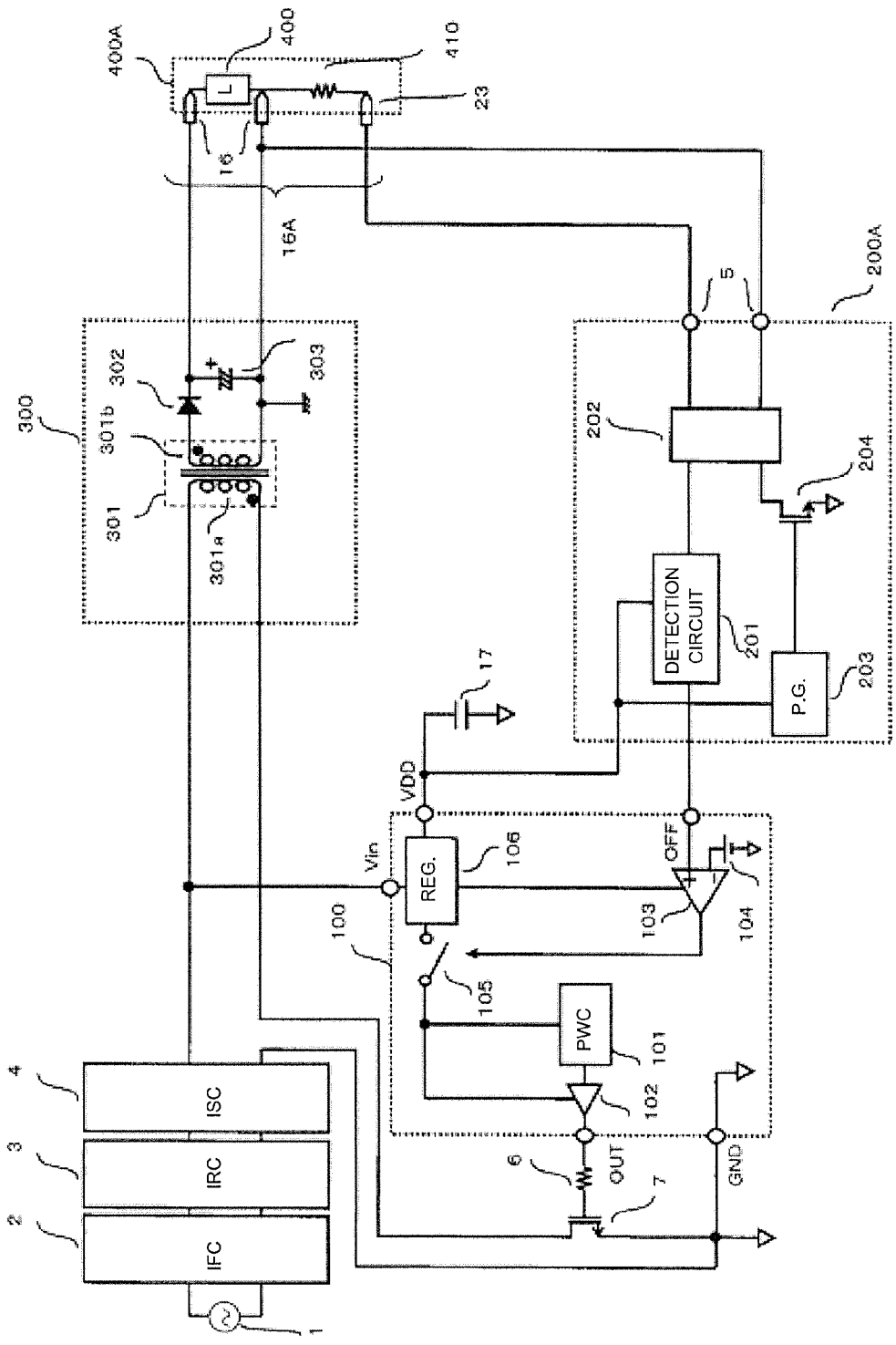
FIG. 18 is a circuit diagram illustrating a configuration example of a. switching power supply apparatus and a device connection state detection circuit according to a ninth exemplary embodiment of the present disclosure.

FIG. 18 illustrates an example of the switching power supply apparatus according to the ninth exemplary embodiment.

Load device 400A includes, for example, load device 400 and resistor 410.

Output terminal 16A includes three terminals including output terminal. 16 and signal terminal 23.

Load device connection terminal 5 has a first end connected to secondary GND terminal, and a second end connected to signal terminal 23.

Hereinafter, components identical with the components of the switching power supply apparatus of the first exemplary embodiment illustrated in FIG. 1 are denoted by the same reference numerals, description of these components is omitted, and operation of a point different from the first exemplary embodiment is mainly described.

In the first exemplary embodiment, device connection state detection circuit 200A detects a connection state of output terminal 16 and load device 400 by impedance Z of load device 400 disposed between terminals included in output terminal 16.

In this exemplary embodiment, device connection state detection circuit 200A performs detection by an impedance of resistor 410 disposed between signal terminal 23 and secondary GND terminal of output terminal 16. In order to detect a difference of the connection state of output terminal 16 and load device 400A, a value of resistor 410 is preferably about several milli-ohm to about several hundred ohm.

Thus, signal terminal 23 according to this exemplary embodiment is added, so that diode 15 and diode 18 that are necessary in the first and second exemplary embodiments can be made unnecessary, and further impedance Z can be easily set by change of the resistance value.

Tenth Exemplary Embodiment

Now, a switching power supply apparatus of a tenth exemplary embodiment of the present disclosure is described.

The switching power supply apparatus according to the tenth exemplary embodiment is different from the switching power supply apparatus according to the first exemplarly embodiment in a configuration of a first rectifier circuit, namely a circuit configuration using PchMOSFET 601 in place of diode 15. Additionally, the switching power supply apparatus according to the tenth exemplary embodiment is different from the switching power supply apparatus according to the first, exemplary embodiment in a configuration of switching control circuit 170, and additional placement of output voltage detection circuit. 20 and photocoupler 19.

Figure 20:
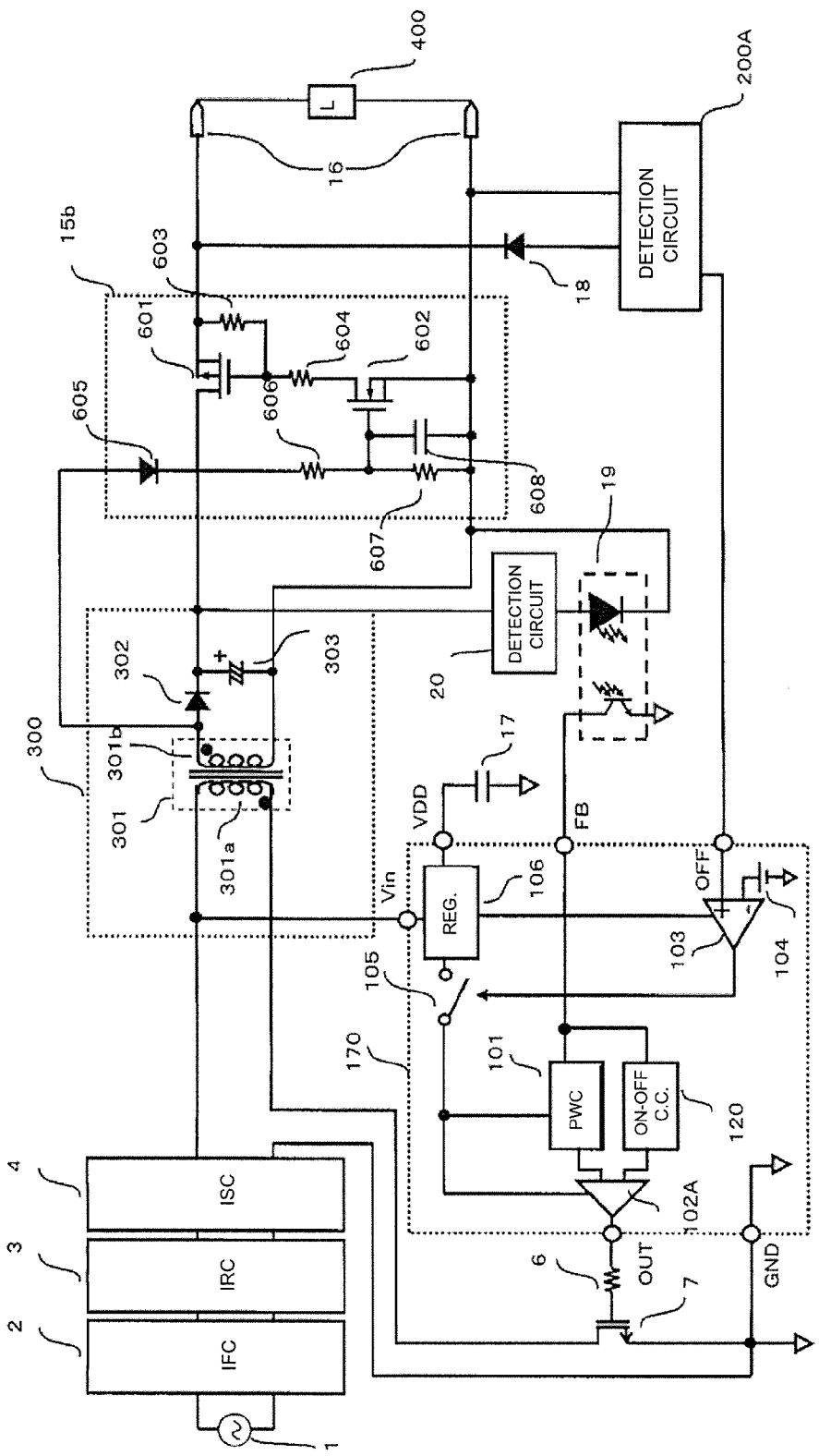
FIG. 20 is a circuit diagram illustrating a configuration example of a first rectifier circuit and periphery of the first rectifier circuit of a switching power supply apparatus according to a tenth exemplary embodiment of the present disclosure.

FIG. 20 illustrates an example of the first rectifier circuit and periphery of the first rectifier circuit of the switching power supply apparatus according to the tenth exemplary embodiment.

Switching control circuit 170 is different from switching control circuit 100 in FIG. 1 in additional placement of ON-OFF control circuit 120 and an FB terminal, and connection of pulse width control circuit 101 and ON-OFF control circuit 120 to drive circuit. 102A.

The FB terminal is a terminal for receiving a feedback signal output from output voltage detection circuit 20, through photocoupler 19, and controlling switching operation.

Output voltage detection circuit 20 is connected to an output voltage line of input/output conversion circuit 300, and generates a feedback signal in accordance with an output voltage value.

Hereinafter, components identical with the components of the switching power supply apparatus of the first exemplary embodiment illustrated in FIG. 1 are denoted by the same reference numerals, description of these components is omitted, and operation of a point different, from the first exemplary embodiment is mainly described.

When the output voltage value becomes not less than a specified voltage set by output voltage detection circuit 20, output voltage detection circuit 20 performs control such that a current flows out from the FB terminal connected to switching control circuit 170 as a feedback signal. By this feedback signal, pulse width control circuit 101 changes, for example, on-duty of switching element 7 to a suitable state, and maintains the output voltage at the specified voltage.

Additionally, when a load becomes light, the current flowing out from the FB terminal becomes large, and ON-OFF control circuit 120 connected to the FB terminal outputs an oscillation stop signal or a frequency drop signal to drive circuit 102A, and a switching frequency of switching element 7 lowers.

First rectifier circuit 15b includes PchMOSFET 601, NchMOSFET 602, resistors 603, 604, 606 and 607, capacitor 608, and diode 605.

PchMOSFET 601 is connected between input/output conversion circuit 300 and output terminal 16, and a drain terminal of NchMOSFET 602 is connected to a gate of PchMOSFET 601 through resistor 604. Resistor 603 is connected between a gate and a source of PchMOSFET 601. When NchMOSFET 602 is turned on, resistor 603 and resistor 604 generate a voltage between the gate and the source of PchMOSFET 601, and PchMOSFET 601 becomes conductive.

Capacitor 608, and serially connected resistors 606 and 607 are connected to a gate of NchMOSFET 602. Diode 605 has an anode connected to a secondary winding wire of transformer 301, and a cathode connected to a gate terminal of NchMOSFET 602 through resistor 606.

Figure 21:
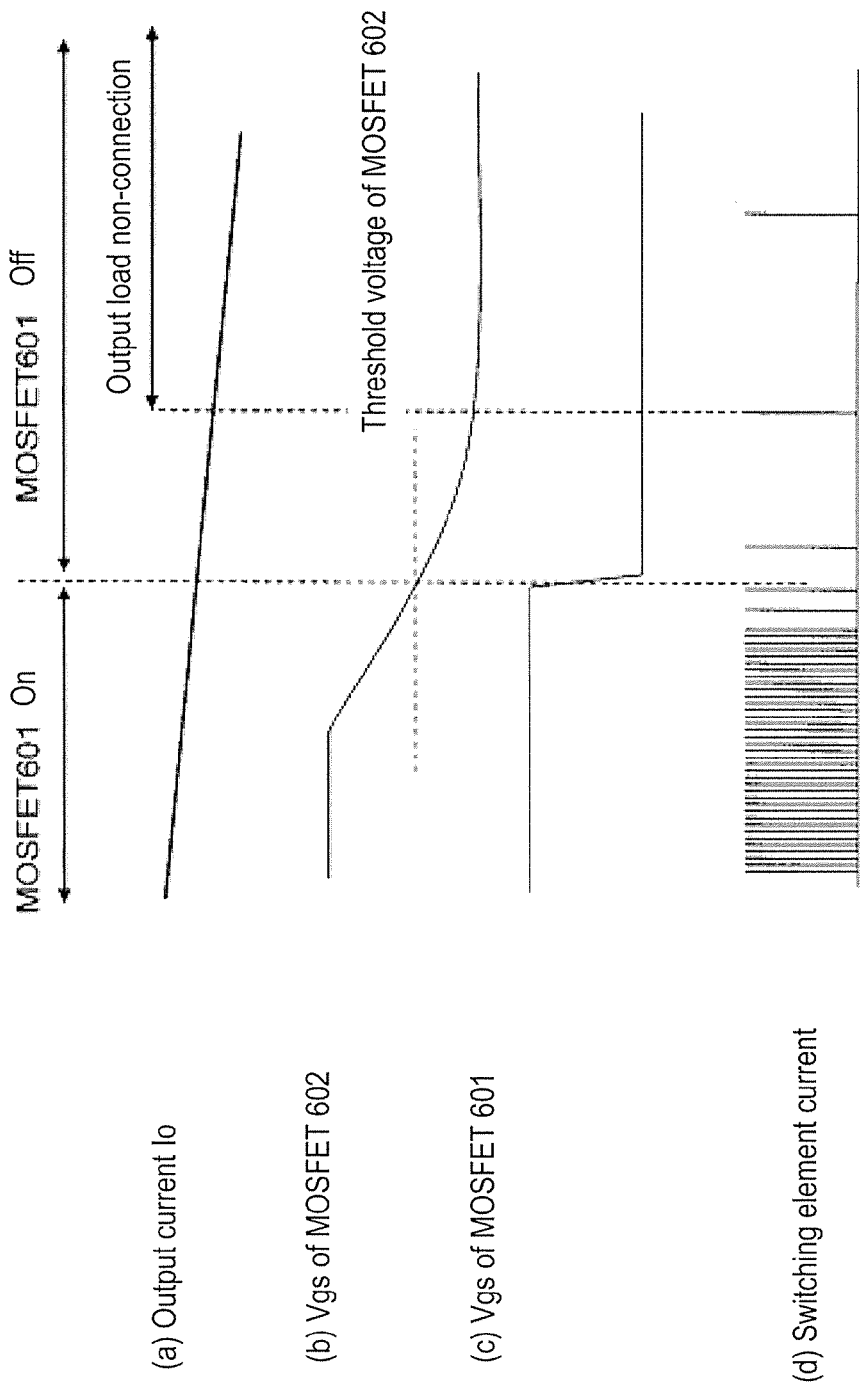
FIG. 21 is a characteristic diagram illustrating operation of the switching power supply apparatus according to the tenth exemplary embodiment of the present disclosure.
Figure 22:
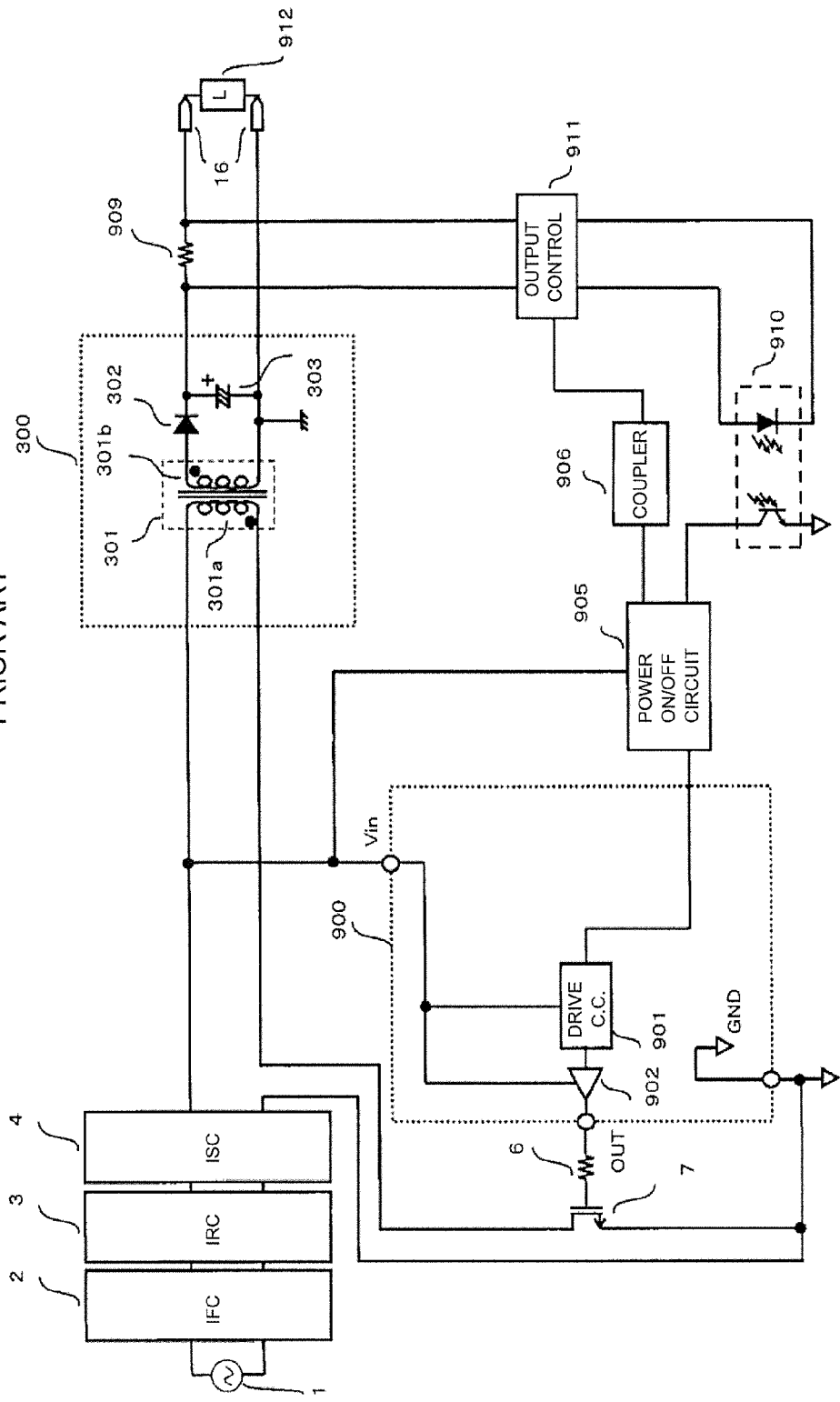
FIG. 22 is a circuit diagram illustrating a configuration example of a switching power supply apparatus according to a conventional example.

FIG. 21 illustrates operation of each unit in the tenth exemplary embodiment.

When load device 400 is in a normal loaded condition, the switching frequency of switching control circuit 170 is large, and therefore a gate voltage of NchMOSFET 602 is held at a fixed voltage value higher than a threshold voltage of NchMOSFET 602.

NchMOSFET 602 is turned on, and the voltage between the gate and the source of PchMOSFET 601 becomes not less than a threshold voltage of PchMOSFET 601 by resistor 603 and resistor 604, and PchMOSFET 601 is turned on.

When load device 400 is brought into a light loaded condition, and the switching frequency of switching control circuit 170 becomes small, the gate voltage of NchMOSFET 602 gradually lowers to become lower than the threshold voltage of NchMOSFET 602, and. NchMOSFET 602 is turned off. Consequently, PchMOSFET 601 is turned off.

That is, rectifier circuit 15b is conductive at low resistance at heavy loading, and interrupts at light loading.

When load device 400 is not connected, a switching power supply apparatus that has a feedback function from a secondary side determines a light load, and controls switching operation so as to reduce output.

For example, even when a condition just before load device 400 is brought into a non-connection state is a heavy loaded condition, the condition is immediately shifted to a light loaded condition.

Accordingly, as shown in the tenth exemplary embodiment, when load device 400 is in the connection state, PchMOSFET 601 is conductive, output of input/output conversion circuit 300 is electrically transmitted to load device 400 with a low loss, load device 400 is brought into the non-connection state. When a light load is detected, PchMOSFET 601 interrupts, and device connection state detection circuit 200A can detect a device connection state.

The switching power supply apparatus according to the present disclosure is described based on the exemplary embodiments, but the present disclosure is not limited to these exemplary embodiments. Any variations of the present exemplary embodiments to be conceived by those skilled in the art or combinations of different exemplary embodiments, without departing from the spirit of the present disclosure, are also within the scope of the present disclosure.

For example, a configuration where device connection state detection circuit 200A of the first exemplary embodiment is replaced by device connection state detection circuit 200B of the second exemplary embodiment is also included in the scope of the present disclosure, and exerts a similar effect.

A configuration where pulse generator 203B of the seventh exemplary embodiment is replaced by any of pulse generator 203 and 203C described in the first to sixth, and eight to tenth exemplary embodiments is also included in the scope of the present disclosure, and exerts a similar effect.

A configuration where first rectifier circuit 15b of the tenth exemplary embodiment is replaced by diode 15 described each of the first to ninth exemplary embodiments is also included in the scope of the present disclosure, and exerts a similar effect.

A configuration where output terminal 16A and load device 400A of the ninth exemplary embodiment are replaced by output terminal 16 and load device 400 described in each of the first and second exemplary embodiments is also included in the scope of the present disclosure, and exerts a similar effect.

Figure 19A:
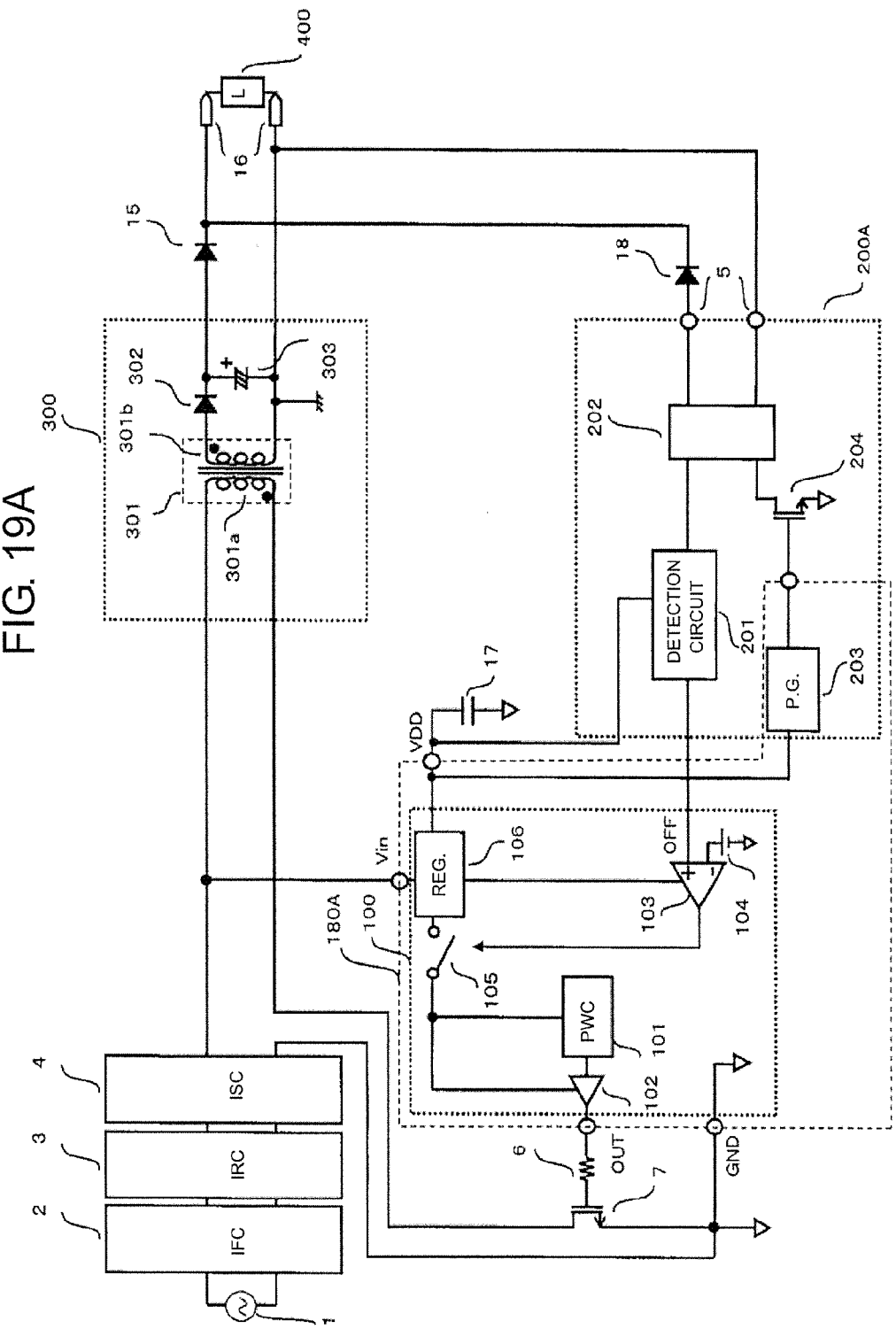
FIG. 19A is a circuit diagram illustrating a configuration example of the switching power supply apparatus and the device connection state detection circuit according to the first exemplary embodiment of the present disclosure.

Like a switching power supply apparatus illustrated in FIG. 19A, semiconductor apparatus 180A including switching control circuit 100 and pulse generator 203 included in the switching power supply apparatus according to the first exemplary embodiment is also included in the scope of the present disclosure.

Figure 19B:
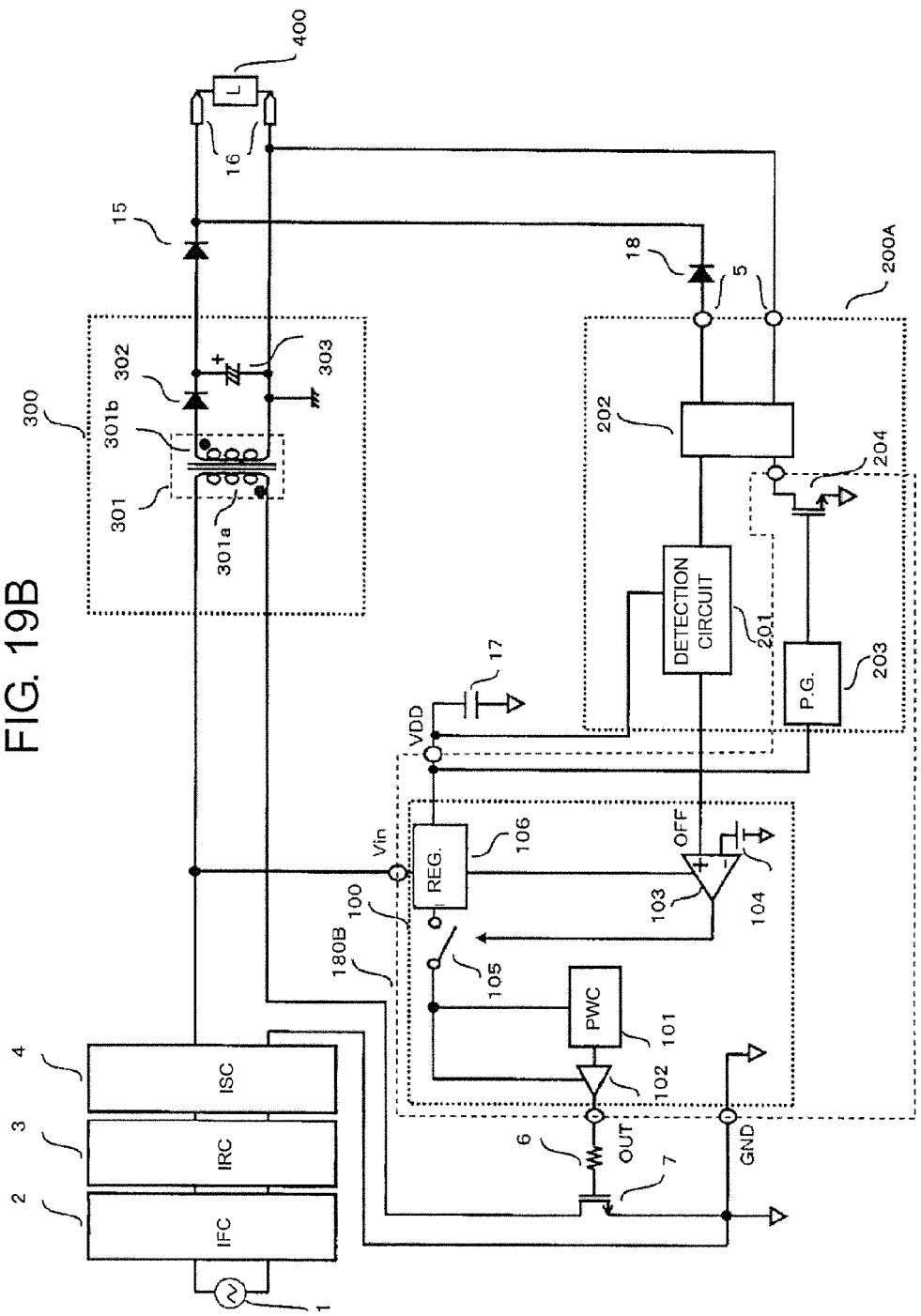
FIG. 19B is a circuit diagram illustrating a configuration example of the switching power supply apparatus and the device connection state detection circuit according to the first exemplary embodiment of the present disclosure.

Like a switching power supply apparatus illustrated in FIG. 19B, semiconductor apparatus 180B including switching control circuit 100, pulse generator 203, and switching element 204 included in the switching power supply apparatus according to the first exemplary embodiment is also included in the scope of the present disclosure.

Figure 19C:
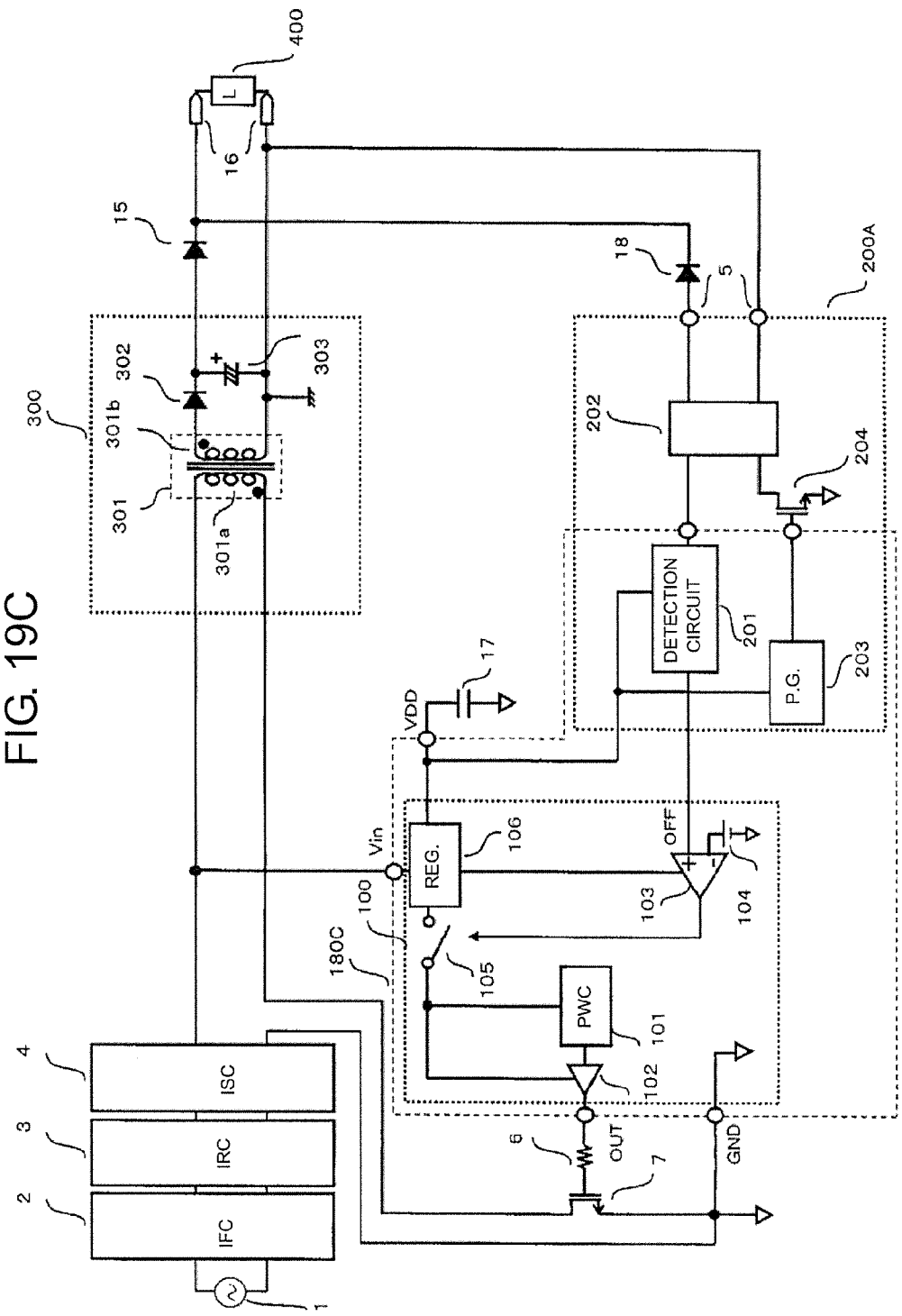
FIG. 19C is a circuit diagram illustrating a configuration example of the switching power supply apparatus and the device connection state detection circuit according to the first exemplary embodiment of the present disclosure.

Like a switching power supply apparatus illustrated in FIG. 19C, a semiconductor apparatus 180C including switching control circuit 100, pulse generator 203, and waveform detection circuit 201 included in the switching power supply apparatus according to the first exemplary embodiment is also included in the scope of the present disclosure.

Each processor included in each of the above semiconductor apparatuses is typically implemented as an integrated circuit. These processors may be individually made into one chip, or may be made into one chip so as to include a part or all.

Circuit integration may be implemented by a microprocessor or a program in addition to a dedicated circuit. An FPGA (Field Programmable Gate Array) and a reconfigurable processor that can reconfigure connection or setting of a circuit cell may be utilized.

Furthermore, if a technology of circuit integration replaced by advance in a semiconductor technology or a different technology derived, from the semiconductor technology appears, each processor may be, of course, integrated by use of the technology. Application of compound semiconductor, an oxide semiconductor, an organic semiconductor, a biotechnology, and the like can be considered.

In the switching power supply apparatus and the device connection state detection circuit of the present disclosure, switching operation of the switching power supply apparatus can be stopped during standby to reduce power consumption of the switching power supply apparatus. Furthermore, the device connection state detection circuit including the waveform detection circuit, the transformer, and the pulse generator is provided, so that start up is possible even in a state where there is no electric charge in a power storage component such as a primary battery and a secondary battery. Additionally, the present disclosure can be effectively adapted to a switching power supply apparatus such as an AC-DC converter and a DC-DC converter incorporated in an electronic device, and an external. AC adapter.

What is claimed is:

1. A switching power supply apparatus comprising:
   a second switching element to which an input voltage is supplied;
   an output terminal connected to a load device;
   an input/output conversion circuit that converts the input voltage switched by the second switching element into an output voltage, and outputs the converted output voltage to the output terminal;
   a switching control circuit that controls switching operation of the second switching element, and has an off mode for stopping the switching operation in accordance with a signal input to an OFF terminal;
   a first rectifier circuit connected between the input/output conversion circuit and the output terminal;
   a transformer having a secondary winding wire whose first end is connected to a first terminal of the output terminal through a second rectifier circuit;
   a first switching element connected to a primary winding wire of the transformer;
   a pulse generator that supplies a pulse signal to a gate terminal of the first switching element; and
   a waveform detection circuit that detects a voltage or a current generated in the primary winding wire or the secondary winding wire of the transformer in accordance with operation of the pulse signal, compares the detected voltage or current with a preset reference value, and outputs an output signal in accordance with a comparison result to the OFF terminal.

2. The switching power supply apparatus according to claim 1, wherein the waveform detection circuit is connected to the primary winding wire of the transformer, detects a voltage or a current generated in the primary winding wire of the transformer, compares the detected voltage or current with the preset reference value, and outputs an output signal in accordance a comparison result to the OFF terminal.

3. The switching power supply apparatus according to claim 1,
   wherein the waveform detection circuit includes:
   a waveform detection circuit transmitter connected to the secondary winding wire of the transformer, and including a light-emitting diode of a photocoupler; and
   a waveform detection circuit receiver connected to the OFF terminal, and including a phototransistor of the photocoupler, and
   wherein the waveform detection circuit transmitter detects a voltage or a current of the secondary winding wire of the transformer, compares the detected voltage or current with the preset reference value, and outputs an output signal in accordance with the comparison result, from the waveform detection circuit receiver to the OFF terminal.

4. The switching power supply apparatus according any one of claim 1 to claim 3, wherein a second end of the secondary winding wire of the transformer is connected to a second terminal of the output terminal.

5. The switching power supply apparatus according any one of claim 1 to claim 3, wherein a second end of the secondary winding wire of the transformer is connected to a connecting point of the input/output conversion circuit and the first rectifier circuit.

6. The switching power supply apparatus according to claim 1, wherein the first rectifier circuit is a diode.

7. The switching power supply apparatus according any one of claim 1 to claim. 3, wherein the first rectifier circuit is formed of a transistor, and the transistor is controlled to interrupt when power consumed by the load device is smaller than a preset power reference value.

8. The switching power supply apparatus according any one of claim 1 to claim 3, wherein operation of the pulse generator oscillates only in the off mode.

9. The switching power supply apparatus according to claim 1, wherein an oscillation frequency of the pulse generator is equal to or lower than a commercial frequency.

10. The switching power supply apparatus according any one of claim 1 to claim 3, further comprising a protective circuit that stops the switching operation of the second switching element when the switching power supply apparatus is abnormal, and controls the switching control circuit so as not to be in the off mode.

* * * * *